(12) United States Patent
Brook

(10) Patent No.: US 10,432,874 B2
(45) Date of Patent: Oct. 1, 2019

(54) SYSTEMS AND METHODS FOR FAST VIDEO CAPTURE AND SENSOR ADJUSTMENT

(71) Applicant: Snap Inc., Venice, CA (US)

(72) Inventor: Peter Brook, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 24 days.

(21) Appl. No.: 15/801,064

(22) Filed: Nov. 1, 2017

(65) Prior Publication Data

US 2018/0124299 A1    May 3, 2018

Related U.S. Application Data

(60) Provisional application No. 62/415,888, filed on Nov. 1, 2016.

(51) Int. Cl.
*H04N 5/235*  (2006.01)
*H04N 5/232*  (2006.01)
*H04N 5/225*  (2006.01)

(52) U.S. Cl.
CPC ......... *H04N 5/2356* (2013.01); *H04N 5/2258* (2013.01); *H04N 5/2351* (2013.01);
(Continued)

(58) Field of Classification Search
CPC ........... H04N 5/23293; H04N 5/23203; H04N 5/232; H04N 5/2356
See application file for complete search history.

(56) References Cited

U.S. PATENT DOCUMENTS 5,754,939 A   5/1998   Herz et al.
6,038,295 A   3/2000   Mattes
(Continued)

FOREIGN PATENT DOCUMENTS

CA   2887596   7/2015
EP   2897355   7/2015
(Continued)

OTHER PUBLICATIONS

Castelluccia, Claude, "EphPub: Toward robust Ephemeral Publishing", 19th IEEE International Conference on Network Protocols (ICNP), (Oct. 17, 2011), 18 pgs.
(Continued)

*Primary Examiner* — Abdelaaziz Tissire
(74) *Attorney, Agent, or Firm* — Schwegman Lundberg & Woessner, P.A.

(57) ABSTRACT

Systems, methods, devices, media, and instructions are described for fast video sensor adjustment. In one embodiment, a portable electronic device with image capturing capabilities automatically captures a first plurality of frames upon selection of an input button while sensors of the device are determining camera settings for the environment. The first plurality of frames are captured using different automatic bracketing settings. Once the camera settings are determined, a second plurality of images are captured using the determined camera settings. One or more of the first plurality of images are used along with the second plurality of images for a video file. The one or more images may be selected based on a match between certain of the automatic bracketing settings and the final camera settings.

20 Claims, 11 Drawing Sheets

(52) U.S. Cl.
CPC ..... *H04N 5/23206* (2013.01); *H04N 5/23216* (2013.01); *H04N 5/23222* (2013.01); *H04N 5/2353* (2013.01); *H04N 5/2354* (2013.01); *H04N 5/23212* (2013.01); *H04N 5/23248* (2013.01)

(56) References Cited

U.S. PATENT DOCUMENTS

| | | |
|---|---|---|
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Roote et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar |
| 2004/0174434 A1 | 9/2004 | Walker et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0044444 A1* | 3/2006 | Okamoto ............... H04N 5/232 348/333.05 |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2009/0189981 A1 | 7/2009 | Siann et al. |
| 2010/0033615 A1 | 2/2010 | Mori |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202523 A1* | 8/2011 | Ota ............... G06F 16/583 707/722 |
| 2011/0202598 A1 | 8/2011 | Evans et al. |
| 2011/0213845 A1 | 9/2011 | Logan et al. |
| 2011/0221896 A1* | 9/2011 | Haddick ............... G02B 27/017 348/143 |
| 2011/0286586 A1 | 11/2011 | Saylor et al. |
| 2011/0314049 A1* | 12/2011 | Poirier ............... H04N 1/00183 707/769 |
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0274806 A1 | 11/2012 | Mori |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0176458 A1* | 7/2013 | Van Dalen ............... H04N 5/232 348/231.99 |
| 2013/0194301 A1 | 8/2013 | Robbins et al. |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0204245 A1* | 7/2014 | Wexler ............... H04N 5/23222 348/231.99 |

(56) References Cited

U.S. PATENT DOCUMENTS

| | | | |
|---|---|---|---|
| 2014/0282096 A1 | 9/2014 | Rubinstein et al. | |
| 2014/0300775 A1 | 10/2014 | Fan et al. | |
| 2014/0325383 A1 | 10/2014 | Brown et al. | |
| 2014/0359024 A1 | 12/2014 | Spiegel | |
| 2014/0359032 A1 | 12/2014 | Spiegel et al. | |
| 2015/0097984 A1* | 4/2015 | Chen | H04N 5/235 348/223.1 |
| 2015/0199082 A1 | 7/2015 | Scholler et al. | |
| 2015/0207994 A1* | 7/2015 | Folchi | H04N 5/23245 348/220.1 |
| 2015/0227602 A1 | 8/2015 | Ramu et al. | |
| 2016/0085773 A1 | 3/2016 | Chang et al. | |
| 2016/0085863 A1 | 3/2016 | Allen et al. | |
| 2016/0086670 A1 | 3/2016 | Gross et al. | |
| 2016/0099901 A1 | 4/2016 | Allen et al. | |
| 2016/0180887 A1 | 6/2016 | Sehn | |
| 2016/0277419 A1 | 9/2016 | Allen et al. | |
| 2016/0295093 A1* | 10/2016 | Yokomizo | G06F 3/04842 |
| 2016/0321708 A1 | 11/2016 | Sehn | |
| 2016/0359957 A1 | 12/2016 | Laliberte | |
| 2016/0359987 A1 | 12/2016 | Laliberte | |
| 2016/0381276 A1* | 12/2016 | Li | H04N 5/23206 348/211.3 |
| 2017/0161382 A1 | 6/2017 | Ouimet et al. | |
| 2017/0263029 A1 | 9/2017 | Yan et al. | |
| 2017/0287006 A1 | 10/2017 | Azmoodeh et al. | |
| 2017/0295250 A1 | 10/2017 | Samaranayake et al. | |
| 2017/0332009 A1* | 11/2017 | Zhang | G06F 3/011 |
| 2017/0347039 A1* | 11/2017 | Baumert | H04N 5/265 |
| 2017/0374003 A1 | 12/2017 | Allen et al. | |
| 2017/0374508 A1 | 12/2017 | Davis et al. | |
| 2018/0103190 A1 | 4/2018 | Nguyen et al. | |
| 2018/0124300 A1 | 5/2018 | Brook | |
| 2018/0316853 A1 | 11/2018 | Liang et al. | |

FOREIGN PATENT DOCUMENTS

| | | |
|---|---|---|
| JP | 2014120815 | 6/2014 |
| WO | 2012000107 | 1/2012 |
| WO | 2013008251 | 1/2013 |
| WO | 2014194262 | 12/2014 |
| WO | 2015192026 | 12/2015 |
| WO | 2016054562 | 4/2016 |
| WO | 2016065131 | 4/2016 |
| WO | 2016/112299 | 7/2016 |
| WO | 2016179166 | 11/2016 |
| WO | 2016179235 | 11/2016 |
| WO | WO-2017069670 A1 | 4/2017 |
| WO | 2017176739 | 10/2017 |
| WO | 2017176992 | 10/2017 |
| WO | 2018005644 | 1/2018 |
| WO | 2018085426 | 5/2018 |

OTHER PUBLICATIONS

Fajman, "An Extensible Message Format for Message Disposition Notifications", Request for Comments: 2298, National Institutes of Health, (Mar. 1998), 28 pgs.

Melanson, Mike, "This text message will self destruct in 60 seconds", URL: http: readwrite.com 2011 02 11 this_text_message_will_self destruct_in_60_seconds, (Feb. 18, 2015), 4 pgs.

Sawers, Paul, "Snapchat for iOS Lets You Send Photos to Friends and Set How long They're Visible For", URL: https: thenextweb.com apps 2012 05 07 snapchat-for-ios-lets-you-send-photos-to-friends-and-set-how-long-theyre-visible-for , (May 7, 2012), 5 pgs.

Shein, Esther, "Ephemeral Data", Communications of the ACM, vol. 56, No. 9, Sep. 20-22, 2013.

Vaas, Lisa, "StealthText, Should You Choose to Accept It", URL: http: www.eweek.com print c a MessagingandCollaboration StealthTextShouldYouChoosetoAcceptIt, (Dec. 13, 2005), 2 pgs.

"International Application Serial No. PCT US2017 059567, International Search Report dated Apr. 5, 2018", 7 pgs.

"International Application Serial No. PCT US2017 059567, Written Opinion dated Apr. 5, 2018", 30 pgs.

"International Application Serial No. PCT US2017 059567, Invitation to Pay Add'l Fees and Partial Search Report dated Feb. 12, 2018", 16 pgs.

Leyden, John, "This SMS will self-destruct in 40 seconds", [Online]. Retrieved from the Internet: URL: http: www. theregister.co.uk 2005 12 12 stealthtext , (Dec. 12, 2005), 1 pg.

"U.S. Appl. No. 15/801,071, Non Final Office Action dated Jan. 30, 2019", 12 pgs.

U.S. Appl. No. 15/801,071, filed Nov. 1, 2017, Systems and Methods for Determining Settings for Fast Video Capture and Sensor Adjustment.

* cited by examiner

SYSTEMS AND METHODS FOR FAST VIDEO CAPTURE AND SENSOR ADJUSTMENT

PRIORITY

This application claims the benefit of priority of U.S. Patent Application Ser. No. 62/415,888, filed on Nov. 1, 2016, which is hereby incorporated by reference herein in its entirety

BACKGROUND

The recording of visual media using portable electronic devices can be performed in a wide-ranging variety of ambient conditions. Some portable devices, such as smart phones or smart glasses, often do not provide for complex control mechanisms to allow manual adjustment of various image capture parameters. This can frustrate efforts to give accurate effect to the intention of a user capturing photo and/or video images using such devices.

These difficulties are in some instances exacerbated by the absence from the device of sensing equipment such as that typically forming part of more sophisticated single-purpose digital cameras or provision on the device of less sophisticated or less costly sensing equipment.

Moreover, photos and videos taken with such portable and/or wearable multi-purpose devices are often captured on the spur of the moment or without excessive preparatory setup of the camera parameters. These factors can result in underwhelming results and can in some cases cause non-optimal on-device resource utilization.

BRIEF DESCRIPTION OF THE DRAWINGS

Various ones of the appended drawings illustrate merely example embodiments of the present disclosure and should not be considered as limiting its scope.

DETAILED DESCRIPTION

Figure 1:
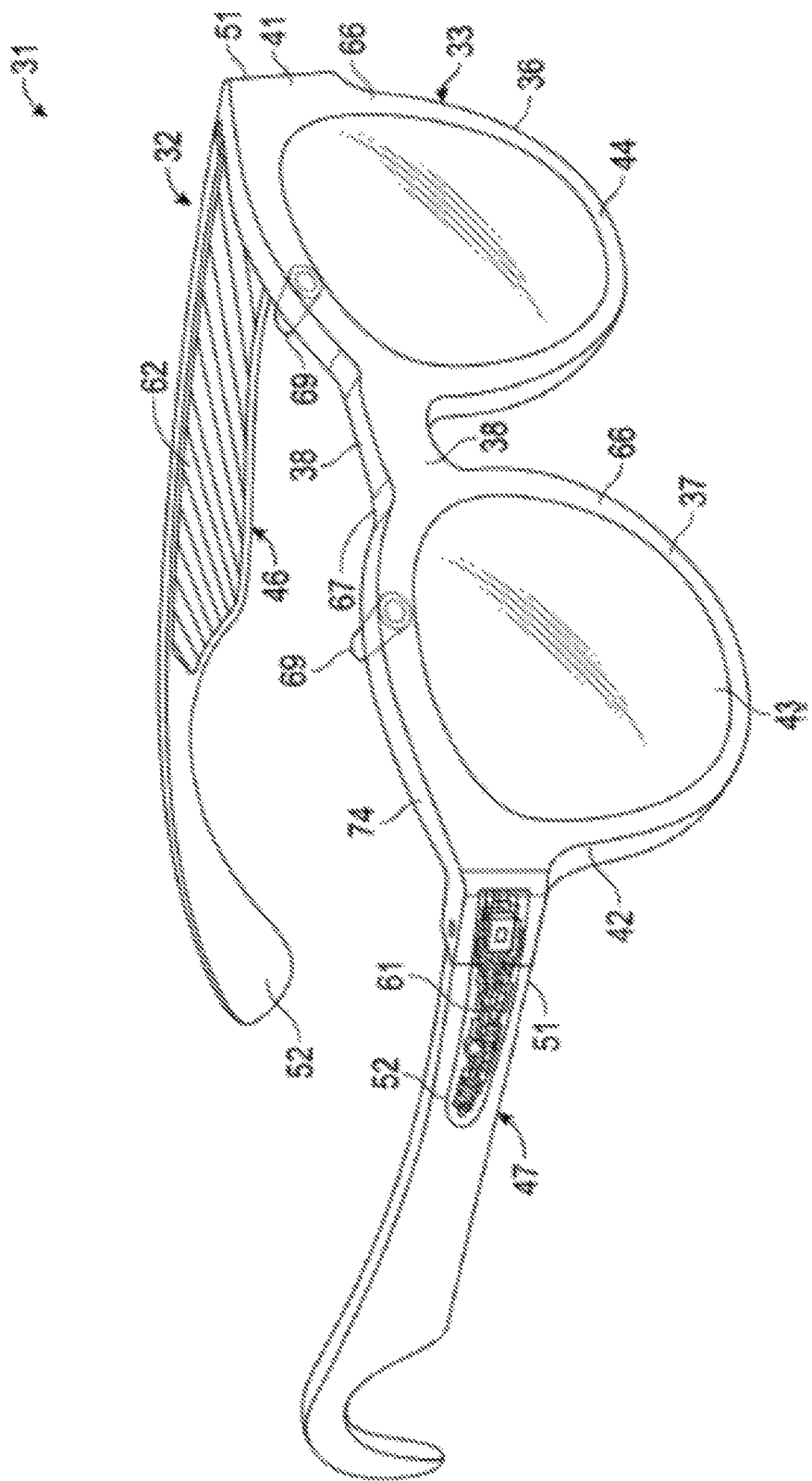
FIG. 1 is a schematic three-dimensional (3D) view of a portable electronic device in the form of electronics-enabled article of eyewear with fast video sensor adjustment functionality, according to one example embodiment.

Embodiments described herein relate to video capture using resource constrained camera devices such as a wearable device that includes camera functionality. Particular embodiments relate to the use of automatic bracketing during the capture of initial frames of a video. As described below, such automatic bracketing enables fast video capture and sensor adjustment in a resource constrained camera environment, and further allows use of video frames captured prior to final selection of camera settings that would otherwise be discarded. The description that follows discusses illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details.

Automatic bracketing, as described herein, refers to the use of different camera settings to capture images several times. Automatic exposure bracketing (AEB) is a type of bracketing where different exposure settings are used. Such settings may be based around target camera settings, with variations in settings given by offset values that "bracket" the target setting. Some camera devices include hardware that is configured to capture multiple copies of a single image using such AEB to provide high dynamic range images. Embodiments described herein may leverage such configurations to provide improvements in video capture, as opposed to capture of individual images.

In a resource constrained video camera environment, such as the use of a video camera in a wearable device, resources and memory are significantly constrained. Immediate responsiveness when a user wants to begin recording a video is valuable, but resources are not available to run the camera until after a user input is received. Due to such resource limitations, in many circumstances, the camera does not operate until the user makes an input selection, and because of this, the device does not have appropriate settings for the current environment. This creates a delay following a user input as the camera adjusts various sensor settings until appropriate settings are identified for the environment. In standard systems, the time from a user input that activates the camera to the camera determining appropriate settings results in a delay between the user selection and the starting time of the video available for playback or recording. Embodiments described herein use automatic bracketing to capture multiple images (e.g., 3 images, 5 images, 10 images, et cetera in various embodiments) using auto bracketing settings prior to the camera determining the appropriate settings for the current environment. These images may be used to determine the appropriate settings, and poor quality images generated by the images captured with the auto bracketing settings are discarded.

In some embodiments, the auto bracketing settings may be compared with the final settings to identify one or more of the initial images to be included in the final video file as matching the determined camera settings for the environment. This enables very fast video capture of initial frames for a video as well as fast automatic sensor adjustment. In some embodiments, post processing may further be used to match one or more images captured using the auto bracketing settings with images captured using the final camera settings. In various embodiments, the auto bracketing settings are used for exposure values such as the exposure time, sensitivity (e.g., International Standards Organization (ISO) values which describe sensitivity to light), shutter speed, and/or f-stop values. In other embodiments, any number of camera settings may be used with auto bracketing during the initial response to a user input to begin recording video.

In some embodiments, a networked communication system may be used to process auto bracketing settings from a large number of devices to update and adjust the auto bracketing settings. Such a system, in certain embodiments, analyzes frame quality and responsiveness for certain auto bracketing settings, and communicates updated settings to devices in the system based on such an analysis. Further, such updated auto bracketing settings, in some embodiments, account for information such as time of day, weather, or location in order to provide different auto bracketing settings to a processor of the camera device. Providing such targeted auto bracketing settings to processor(s) of a camera device prior to the image sensors being activated enables fast video capture and sensor adjustment. In some embodiments, user settings allow a user to select certain auto bracketing settings for a device.

Various aspects and alternative configurations will now be described with reference to more detailed example embodiments. FIGS. 1-3 illustrate an example embodiment of an electronic device implementing various disclosed techniques, with the electronic device being in the example form of an article of eyewear constituted by electronics-enabled glasses 31, which may further operate within a network system 100 or 101 for communicating image and video content. FIG. 1 shows a front perspective view of the glasses 31 which, in accordance with this example embodiment, provide for auto bracketing of one or more image-capture parameters responsive to user engagement with a single-action input mechanism.

The glasses 31 can include a frame 32 made from any suitable material such as plastic or metal, including any suitable shape memory alloy. The frame 32 can have a front piece 33 that can include a first or left lens, display or optical element holder 36 and a second or right lens, display, or optical element holder 37 connected by a bridge 38. The front piece 33 additionally includes a left end portion 41 and a right end portion 42. A first or left optical element 43 and a second or right optical element 44 can be provided within respective left and right optical element holders 36, 37. Each of the optical elements 43, 44 can be a lens, a display, a display assembly, or a combination of the foregoing. In some embodiments, for example, the glasses 31 are provided with an integrated near-eye display mechanism that enables, for example, display to the user of preview images for visual media captured by cameras 69 of the glasses 31.

Frame 32 additionally includes a left arm or temple piece 46 and a second arm or temple piece 47 coupled to the respective left and right end portions 41, 42 of the front piece 33 by any suitable means such as a hinge (not shown), so as to be coupled to the front piece 33, or rigidly or fixably secured to the front piece so as to be integral with the front piece 33. Each of the temple pieces 46 and 47 can include a first portion 51 that is coupled to the respective end portion 41 or 42 of the front piece 33 and any suitable second portion 52, such as curved or arcuate piece, for coupling to the ear of the user. In one embodiment, the front piece 33 can be formed from a single piece of material, so as to have a unitary or integral construction. In one embodiment, such as illustrated in FIG. 1, the entire frame 32 can be formed from a single piece of material so as to have a unitary or integral construction.

Glasses 31 can include a computing device, such as computer 61, which can be of any suitable type so as to be carried by the frame 32 and, in one embodiment, of a suitable size and shape, so as to be at least partially disposed in one of the temple pieces 46 and 47. In one embodiment, as illustrated in FIG. 1, the computer 61 is sized and shaped similar to the size and shape of one of the temple pieces 46, 47 and is thus disposed almost entirely, if not entirely, within the structure and confines of such temple pieces 46 and 47. In one embodiment, the computer 61 can be disposed in both of the temple pieces 46, 47. The computer 61 can include one or more processors with memory, wireless communication circuitry, and a power source. The computer 61 comprises low-power circuitry, high-speed circuitry, and a display processor. Various other embodiments may include these elements in different configurations or integrated together in different ways. Additional details of aspects of computer 61 may be implemented as described with reference to the description that follows.

The computer 61 additionally includes a battery 62 or other suitable portable power supply. In one embodiment, the battery 62 is disposed in one of the temple pieces 46 or 47. In the glasses 31 shown in FIG. 1, the battery 62 is shown as being disposed in left temple piece 46 and electrically coupled using connection 74 to the remainder of the computer 61 disposed in the right temple piece 47. The one or more input and output devices can include a connector or port (not shown) suitable for charging a battery 62 accessible from the outside of frame 32, a wireless receiver, transmitter or transceiver (not shown), or a combination of such devices.

Glasses 31 include digital cameras 69. Although two cameras are depicted, other embodiments contemplate the use of a single or additional (i.e., more than two) cameras. For ease of description, various features relating to the cameras 69 will further be described with reference to only a single camera 69, but it will be appreciated that these features can apply, in suitable embodiments, to both cameras 69.

In various embodiments, glasses 31 may include any number of input sensors or peripheral devices in addition to cameras 69. Front piece 33 is provided with an outward facing, forward-facing, or front or outer surface 66 that faces forward or away from the user when the glasses 31 are mounted on the face of the user, and an opposite inward-facing, rearward-facing or rear or inner surface 67 that faces the face of the user when the glasses 31 are mounted on the face of the user. Such sensors can include inwardly-facing video sensors or digital imaging modules such as cameras that can be mounted on or provided within the inner surface 67 of the front piece 33 or elsewhere on the frame 32 so as to be facing the user, and outwardly-facing video sensors or digital imaging modules such as the cameras 69 that can be mounted on or provided with the outer surface 66 of the front piece 33 or elsewhere on the frame 32 so as to be facing away from the user. Such sensors, peripheral devices, or peripherals can additionally include biometric sensors, location sensors, accelerometers, or any other such sensors.

The glasses 31 further include an example embodiment of a camera control mechanism or user input mechanism comprising a camera control button mounted on the frame 32 for haptic or manual engagement by the user. The control button provides a bi-modal or single-action mechanism in that it is disposable by the user between only two conditions, namely an engaged condition and a disengaged condition. In this example embodiment, the control button is a pushbutton that is by default in the disengaged condition, being depressible by the user to dispose it to the engaged condition. Upon release of the depressed control button, it automatically returns to the disengaged condition.

In other embodiments, the single-action input mechanism can instead be provided by, for example, a touch button comprising a capacitive sensor mounted on the frame 32 adjacent its surface for detecting the presence of a user's finger in order to dispose the touch-sensitive button to the engaged condition when the user touches a finger to the corresponding spot on the outer surface of the frame 32. It will be appreciated that the above-described push button and capacitive touch button are but two examples of a haptic input mechanism for single-action control of the camera 69, and that other embodiments may employ different single-action haptic control arrangements.

Figure 2A:
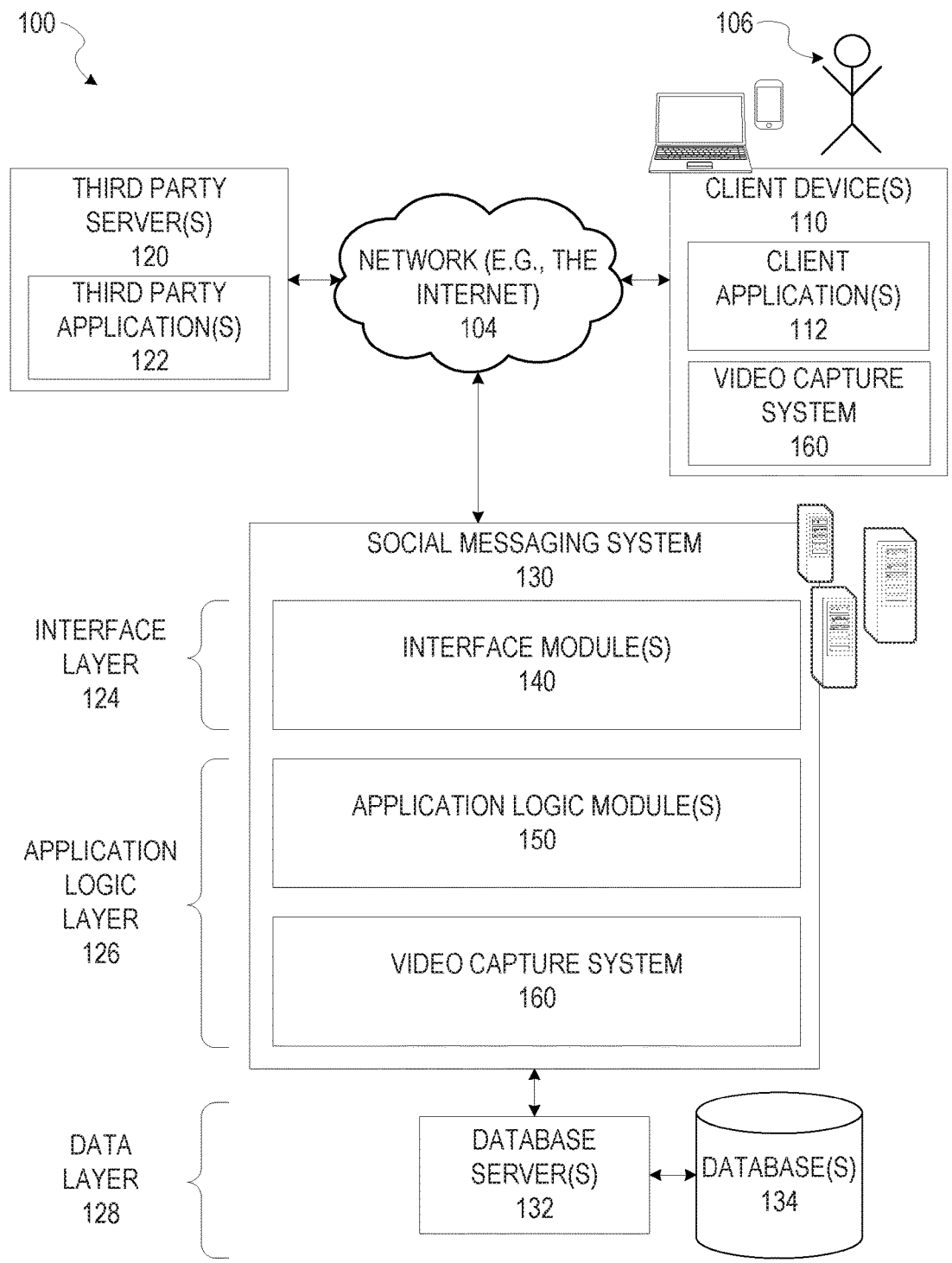
FIG. 2A illustrates aspects of a system including devices with fast video sensor adjustment, in accordance with some embodiments.
Figure 3:
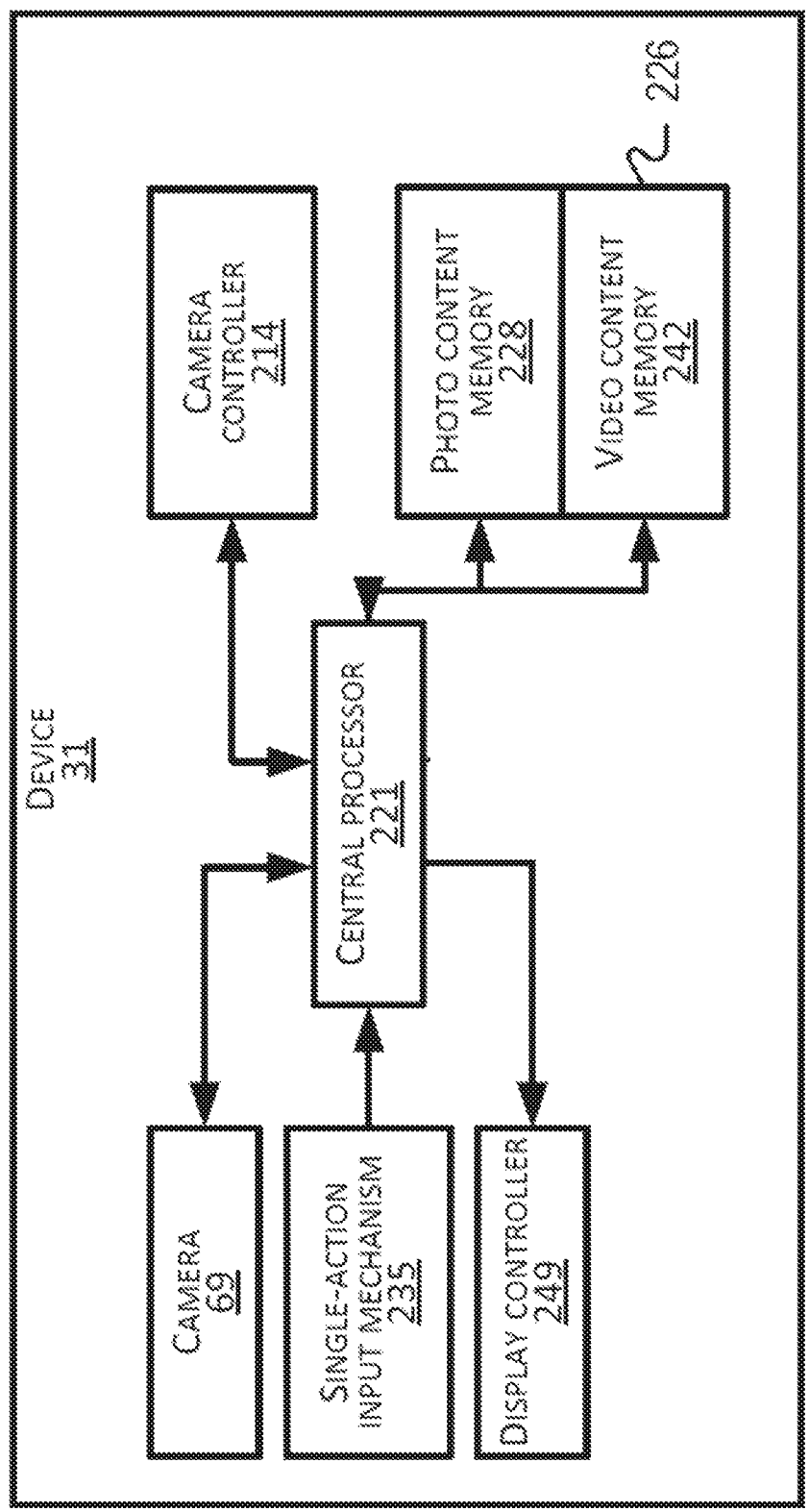
FIG. 3 is a schematic block diagram of selected functional components of a portable electronic device with automatically adjustable image-capturing functionality, according to an example embodiment.

FIG. 2A is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving video content as well as text and other media communication, etc.) and aspects associated with the network system 100 and its users. Although illustrated herein as client-server architecture, other embodiments may include other network architectures, such as peer-to-peer or distributed network environments.

As shown in FIG. 2A, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 2A represents a set of executable software instructions and the corresponding hardware (e.g., memory and processor) for executing the instructions. In various embodiments, additional functional modules and engines may be used with a social messaging system, such as that illustrated in FIG. 2A, to facilitate additional functionality that is not specifically described herein. Furthermore, the various functional modules and engines depicted in FIG. 2A may reside on a single server computer, or may be distributed across several server computers in various arrangements. Moreover, although the social messaging system 130 is depicted in FIG. 2A as a three-tiered architecture, the inventive subject matter is by no means limited to such an architecture.

As shown in FIG. 2A, the interface layer 124 consists of interface modules (e.g., a web server) 140, which receive requests from various client-computing devices and servers, such as client devices 110 executing client applications 112, and third party servers 120 executing third party applications 122. In response to received requests, the interface modules 140 communicate appropriate responses to requesting devices via a network 104. For example, the interface modules 140 can receive requests such as Hypertext Transfer Protocol (HTTP) requests, or other web-based Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client devices 110 are executing the client applications 112. The client applications 112 can provide functionality to present information to a user 106 and communicate via the network 104 to exchange information with the social messaging system 130. Each of the client devices 110 can comprise a computing device that includes at least a display and communication capabilities with the network 104 to access the social messaging system 130. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Users 106 can include a person, a machine, or other means of interacting with the client devices 110. In some embodiments, the users 106 interact with the social messaging system 130 via the client devices 110.

As shown in FIG. 2A, the data layer 128 has one or more database servers 132 that facilitate access to information storage repositories or databases 134. The databases 134 are storage devices that store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the social messaging system 130. For instance, a social messaging application can be implemented with one or more of the application logic modules 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic modules 150.

As illustrated in FIG. 2A, the social messaging system 130 and/or client devices 110 includes a video capture system 160 that provides functionality to enable fast video capture and sensor adjustment. As described above, some embodiments may use a system such as social messaging system 130 to provide auto bracketing settings, to receive feedback on certain auto bracketing settings, and to update auto bracketing settings based on various parameters. In other various embodiments, the video capture system 160 can be implemented as a standalone system and is not necessarily included in the social messaging system 130. In some embodiments, the client devices 110 include a portion of the video capture system 160 (e.g., a portion of the video capture system 160 may be included independently or in the client applications 112). In embodiments where the client devices 110 includes a portion of the video capture system 160, the client devices 110 can work alone or in conjunction with the portion of the video capture system 160 included in a particular application server or included in the social messaging system 130.

Figure 2B:
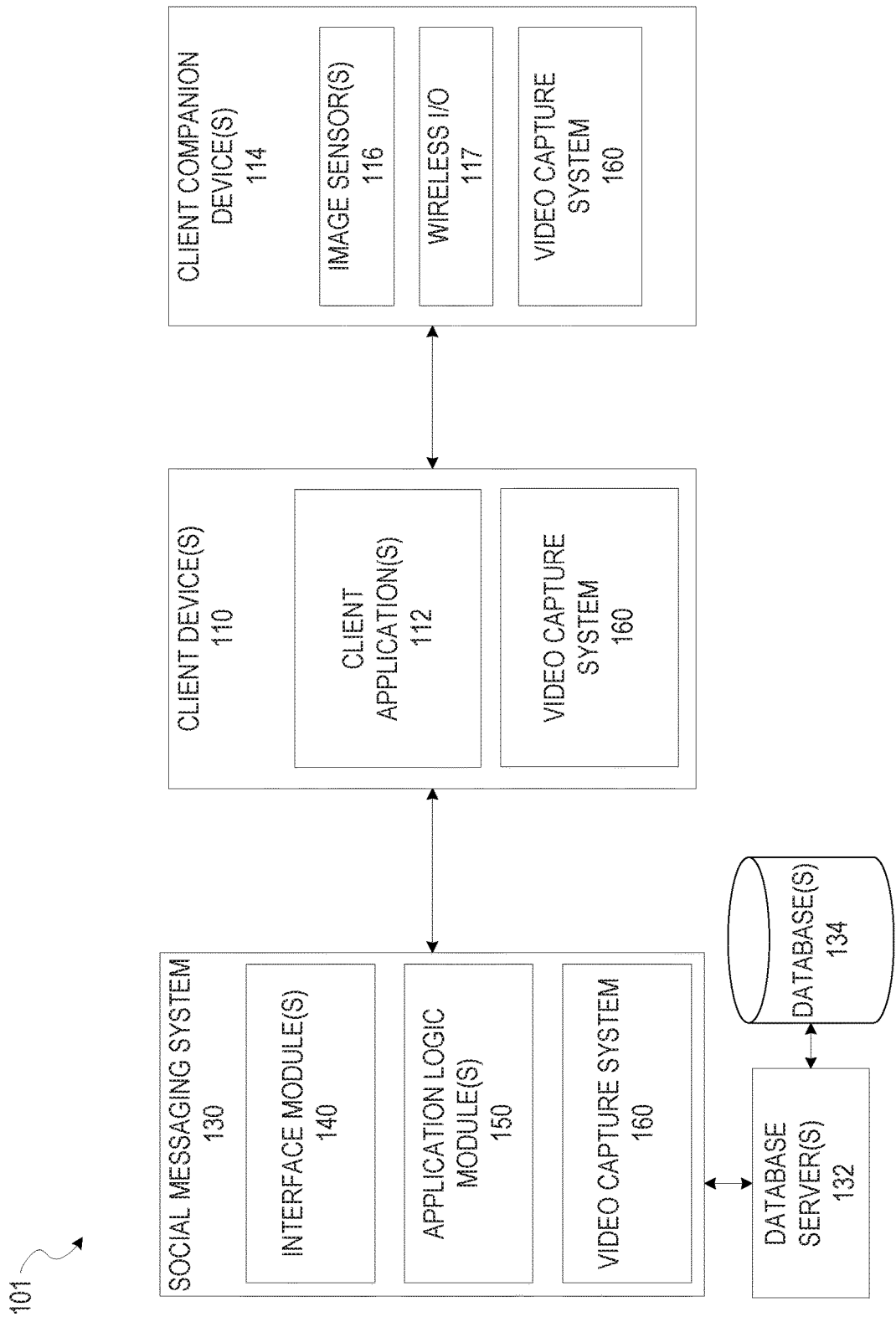
FIG. 2B illustrates aspects of a system including devices with fast video sensor adjustment, in accordance with some embodiments.

FIG. 2B illustrates an alternative network system 101 that may be used with certain embodiments. Network system 101 includes social messaging system 130 with interface modules 140, application logic modules 150, database servers 132, and databases 134, as well as client devices 110 operating client applications 112, just as in network system 100. Network system 101, however, additionally includes client companion devices 114 connected to client devices 110. Client companion devices 114 may be wearable devices such as glasses, visors, watches, or other network enabled items. Client companion devices may also be any device described herein that accesses a network such as network 104 via another device such as client device 110. Client companion devices 114 include image sensors 116, wireless input and output (I/O) 117, and elements of video capture system 160. Just as described above, in some embodiments, a device such as client companion device 114 may operate with a stand-alone video capture system 160. In such embodiments, video capture system 160 operates with image sensors 116 to enable fast video capture and sensor adjustments. Client companion devices 114 may include one or more processors, a display, a battery, and a memory, but may have limited processing and memory resources. In such embodiments, client device 110 and/or server computing devices used for social messaging system 130 may be used via network connections to provide remote processing and memory resources for client companion devices 114. In one embodiment, for example, client companion device 114 may be a pair of network enabled glasses, such as the glasses of FIG. 1, and client device 110 may be a smartphone that enables access to social messaging system 130 to enable communication of video content captured with image sensor(s) 116.

FIG. 3 is a schematic diagram illustrating some of the components of the example electronic device in the form of the glasses 31. Note that a corresponding arrangement of interacting machine components can apply to embodiments in which an electronic device consistent with the disclosure comprises, for example, a mobile electronic device such as a wearable device (e.g. glasses 31), a smartphone (e.g., such as that described with reference to FIG. 5), a tablet, or a digital camera. The computer 61 (FIG. 1) of the glasses 31 includes a processor 221 in communication with an onboard memory 226. The central processor 221 may be a central processing unit and/or a graphics processing unit. The memory 226 in this example embodiment comprises a combination of flash memory and random access memory.

The device 31 further includes a camera controller 214 in communication with the central processor 221 and the camera 69. The camera controller 214 comprises circuitry configured to control recording of either photographic content or video content based upon processing of control signals received from the single action input mechanism (indicated generally by item 235 in FIG. 2) that includes the control button, and to provide for automatic adjustment of one or more image-capture parameters pertaining to capturing of image data by the camera 69 and on-board processing of the image data prior to persistent storage thereof and/or to presentation thereof to the user for viewing or previewing. The automatic adjustment of image-capture parameters includes, in various embodiments, capture of multiple images using a set of auto bracketing settings for the device, prior to a determination based on sensor feedback, of the appropriate camera settings for the current environment. Camera controller 214 will thus interact with central processor 221 to initiate capture of a first set of images based on the auto bracketing parameters directly following receipt of an input at mechanism 235, and a second set of images based on camera settings determined by sensor readings taken after receipt of the input at the input mechanism (e.g. a single action mechanical button, an electronic touch sensor, a voice activated input, etc.)

In some embodiments, the camera controller 214 comprises permanently configured circuitry, such as firmware or an application-specific integrated circuit (ASIC) configured to perform the various functions described. In other embodiments, the camera controller 214 may comprise a dynamically reconfigurable processor executing instructions that temporarily configure the processor to execute the various functions described.

The camera controller 214 interacts with the memory 226 to store, organize, and present image content in the form of photo content and video content. To this end, the memory 226 in this example embodiment comprises a photo content memory 228 and a video content memory 242. The camera controller 214 is thus, in cooperation with the central processor 221, configured to receive from the camera 69 image data representative of digital images captured by the camera 69 in accordance with some of the image capture parameters, to process the image data in accordance with some of the image capture parameters, and to store the processed image data in an appropriate one of the photo content memory 228 and the video content memory 242.

The camera controller 214 is further configured to cooperate with a display controller 249 to cause display on a display mechanism incorporated in the glasses 31 of selected photos and videos in the memory 226 to provide previews of captured photos and videos. In some embodiments, camera controller 214 will manage processing of images captured using automatic bracketing parameters for inclusion in a video file.

The single-action input mechanism 235 is communicatively coupled to the central processor 221 and the camera controller 214 to communicate signals representative of current state of the camera control button as to whether or not the camera controller 214 is currently being pressed. The camera controller 214 further communicates with the central processor 221 regarding the input signals received from the single-action input mechanism 235. In one embodiment, the camera controller 214 is configured to process input signals received via the single action input mechanism 235 to determine whether a particular user engagement with the camera control button is to result in a recording of video content or photographic content, and/or to dynamically adjust one or more image-capturing parameters based on processing of the input signals. For example, pressing of the camera control button for longer than a predefined threshold duration causes the camera controller 214 automatically to apply relatively less rigorous video processing to captured video content prior to persistent storage and display thereof. Conversely, pressing of the camera control button for shorter than the threshold duration in such an embodiment causes the camera controller 214 automatically to apply relatively more rigorous photo stabilization processing to image data representative of one or more still images. In such embodiments, any press of mechanism 235 will result in an initial set of images being captured with auto bracketing settings, regardless of whether a determination is made that an image or a video is to be captured.

In this embodiment, the camera controller 214 is also configured for cooperating with the camera 69 to dynamically adjust one or more image-capturing parameters based on at least one image metric calculated based on image data representative of digital images captured by the camera 69. In such embodiments, the images captured using auto bracketing values are used to calculate details of the current environment and then to select camera settings. Embodiments thus provide for automated, dynamic adjustment or tuning of camera parameters (e.g., an ISO level) of the camera 69 based on sensor data (e.g. a calculated brightness value for multiple digital frames recorded by the camera 69.)

The glasses 31 may further include various components common to mobile electronic devices such as smart glasses or smart phones, for example including a display controller for controlling display of visual media (including photographic and video content captured by the camera 69) on a display mechanism incorporated in the device. Note that the schematic diagram of FIG. 2 is not an exhaustive representation of all components forming part of the glasses 31.

Figure 4A:
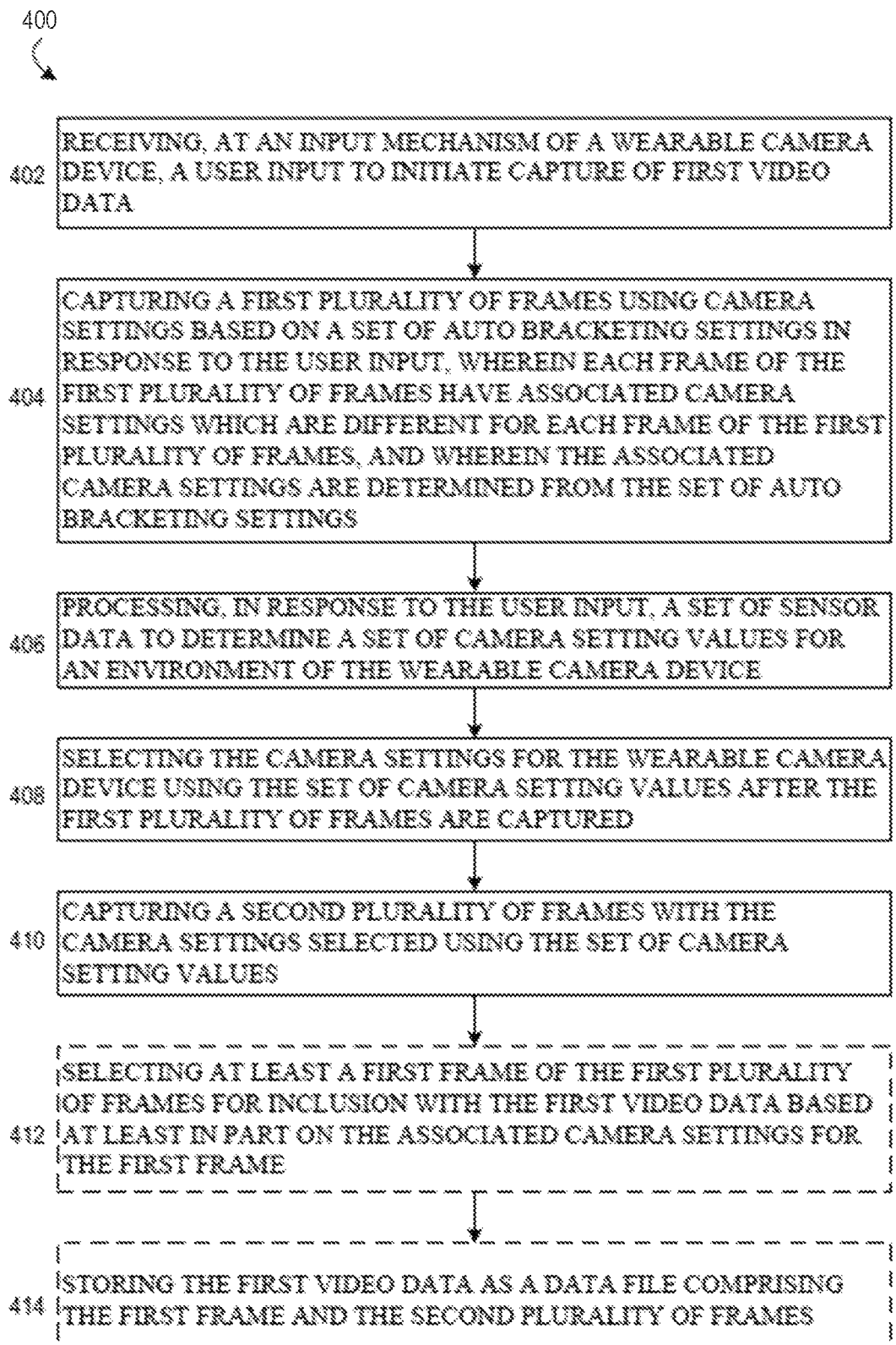
FIG. 4A illustrates a method for fast video sensor adjustment, in accordance with some example embodiments.

FIG. 4A illustrates a method 400 that is performed by a wearable camera device (e.g. glasses 31) to provide for fast video capture and sensor adjustment. Various other similar methods may be performed by other devices such as smartphones or other such camera devices. Method 400 particularly provides for improved response in an environment that is resource constrained such that sensors for determining camera settings are not operated until a user selection is received and where the delay time between an initial user selection at an input and the capture of an initial image of a video clip is an important device characteristic. In various other embodiments, similar methods may be performed by one or more processors of a device to implement corresponding operations. Additionally, some embodiments of method 400 are implemented as computer readable instructions in a storage medium that, when executed by one or more processors of a camera device, cause the device to perform operations similar to those of method 400.

Method 400 begins with operation 402 where an input mechanism (e.g. mechanism 235) of a wearable camera device receives a user input to initiate capture of first video data. In various embodiments, the initial signal may provide an ambiguous command, where a timer determines whether the initial signal is associated with either an image capture or a video capture. In either situation, the initial signal is used as an indication for video capture, which is later adjusted to an image capture signal based on additional information from the input mechanism. For example, an initial depression of a mechanical button operates as a user input to initiate capture of video data. If the button is released prior to a threshold time, only an image is stored, whereas if the button is held for longer than the threshold time, video is captured during the time the button/mechanism is activated. According to embodiments described herein, either case operates as receipt of an indication of a user input to initiate capture of first video data.

In response to the user input to initiate capture of video data from operation 402, operation 404 then involves capturing a first plurality of frames using camera settings based on a set of auto bracketing settings in response to the user input. In some embodiments, each frame of the first plurality of frames has associated camera settings which are different for each frame of the first plurality of frames, and the associated camera settings are determined from the set of auto bracketing settings. For example, the auto bracketing settings may include three values for ISO settings, and three values for exposure time (e.g. shutter speed). The auto bracketing settings may indicate that the device is configured to take images at all nine combinations for these values In operation 406, a set of sensor data is processed to determine a set of camera setting values for an environment of the wearable camera device. During capture of the images with auto bracketing settings, the device further processes sensor data, which may either be data from these captured images, or data from other sensors, to select a final group of camera settings based on the measured environment. In various embodiments, any number of auto bracketing settings may be used, with any number of values for each setting. Various embodiments limit the total number of captured images to avoid excessive setup time prior to configuring the camera with the selected camera settings based on the sensor data. Some embodiments may include single measurements at each value for each auto bracketing value type, so that only three images would be captured out of the nine possible combinations above, with the selected values based on the combinations that provide sensor information balanced against the delay time used capturing the images.

After the sensor data is processed, either from the captured images, from other data captured from the imaging device, or from sensors other than the imaging device used to capture the video frames, the processors of the device process the sensor data to determine a set of camera setting values based on this sensor data. Operation 408 then involves selecting the camera settings for the wearable camera device using the set of camera setting values after the first plurality of frames are captured.

Once the camera settings are configured based on the sensor data describing the current environment, the device proceeds with capturing a second plurality of frames with the camera settings selected using the set of camera setting values in operation 410.

As the images for the video clip are captured, certain embodiments perform operation 412 to include one or more of the images captured using the auto bracketing settings in the final video clip. Operation 412 includes such frames by selecting at least a first frame of the first plurality of frames for inclusion with the first video data based at least in part on the associated camera settings for the first frame. In some embodiments, for example, the device may determine that the set of camera setting values determined in operation 408 are similar to settings for one of the images captured using the auto bracketing settings. If the final settings are within a threshold similarity of the auto bracketing setting for the particular image, the image may automatically be processed for inclusion in the final video file. In other embodiments, one or more images may undergo additional post-processing to match the initial image or images captured during the auto bracketing operations with the images captured using the final camera settings.

In operation 414, the images captured using the selected set of camera setting values are stored along with one or more of the selected images from the auto bracketing operation, based on the quality of the one or more images and the match with the rest of the images of the video clip. The images may be stored as raw data in a memory of the device, or may go through additional processing and compression prior to storage in the memory of the device.

In various embodiments, the auto bracketing settings may be based upon values directly tied to the physical features of the camera and selected based on a determined functionality of the physical characteristics of the camera. Such settings may be stored in a memory of the camera device and used by the processor(s) of the device when an input is received initiating video capture. In other embodiments, these characteristics may change over time, based on anticipated environments of an individual user or a group of users. As described above, in some embodiments, a messaging or communication system that interacts with a camera device may record data associated with video clip generation, such as response times, auto bracketing values, and image quality metrics.

In some embodiments, such data is processed to meet threshold responsiveness or quality targets. Responsiveness targets refer to a target time between receiving a user input at a device input mechanism and the time of a first frame used in a stored video file. Quality targets refer to the quality of the first image in a stored video file. In some embodiments, these quality values and thresholds are additionally tracked against known environmental factors. Such factors may be a time of day, a time of year, a location, standardized weather reports, or other such factors. Using such factors, the set of test exposures to be generated at each device with auto bracketing values can be adjusted. Further, an order of which auto bracketing values are to be used may be adjusted based on such data. In some embodiments, a device may interrupt the capture of auto bracketing values once the processors of the device determine the set of camera setting values. One embodiment, for example, may have 20 different auto bracketing sets, but determines a set of camera settings from sensor data after only 10 images associated with the first 10 different auto bracketing sets have been captured.

In various example embodiments, the camera settings may be determined in different ways during capture of the initial frames using auto bracketing settings. As described above, in various embodiments these settings are determined concurrently with the capture of the initial frames after a video capture mode is invoked. In various embodiments, a video capture mode is invoked by user-selected activation of a corresponding mode on the glasses 31 or by launching of an application that has image-capturing functionality. In other embodiments, the visual capture mode may be invoked automatically in response to user engagement with the single-action input mechanism 235 (e.g., in response to haptic engagement of the camera control button).

User engagement with the input mechanism in the example form of the camera control button is detected. As described previously, the camera control button is, in this example embodiment, disposable to an activated or engaged condition by haptic or manual user engagement therewith. Disposal of the control button to the deactivated or disengaged condition can be achieved by user release thereof. In other embodiments, for example in embodiments where the automated image capture control techniques described herein are provided in cooperation with a smartphone or tablet device, the mechanism may comprise a soft button displayed on a touch sensitive screen of the device (see, e.g., soft button 525 in FIG. 5).

In some embodiments, in response to the user's pressing of the camera control button, a timer is started, and video content captured by the camera 69 is recorded using temporary storage of image data representative of the video content. As described above, these initial frames are captured using a sequence of auto bracketing camera settings. The timer is executed under control of the central processor 221 and/or the camera controller 214. It will be appreciated that the media content in conventional fashion comprises a sequence of still digital images captured by the camera 69. Each of these still digital images forming part of the video content is referred to as a respective video frame.

In this example embodiment, the camera controller 214 is configured for real-time processing of the initial frames of the recorded frames, to determine a value for one or more image metrics of the processed frames, and to automatically select settings for the camera 69 or the camera controller 214 based on the image metrics determined from the processed frames. Additional further frames recorded subsequent to the automatic selection of the camera parameters are then made based on similar analysis of some or all frames captured after the camera is configured with the camera settings from the initial frames. In other words, the frames may be continually processed to identify changes in the environment in which the video is being captured, and to update the camera settings as the environment changes, using operations similar to those used in the auto bracketing operations to set the initial camera settings. In some embodiments, the plurality of frames that are processed to calculate the image metric is a predefined number of consecutive frames captured at the outset of the recording responsive to pressing of the camera control button. In some embodiments, the image data on which auto-adjustment of image capture parameters is based is for the first ten video frames captured using the automatic bracketing settings subsequent to pressing of the camera control button. In other embodiments, image metric calculations can be based on any number of frames, or on a plurality of non-consecutive frames taken at intervals corresponding to multiple omitted intervening frames.

In some embodiments, the glasses 31 are configured automatically to adjust a sensitivity parameter, in this example expressed as an ISO level, that determines sensitivity to light incident thereon of an optical sensor provided by a charge coupled device forming part of the camera 69. The image metric value upon which such dynamic auto-adjustment is based is in this instance a brightness metric indicative of a brightness attribute of the images represented by the plurality of processed frames. Note that other image capture parameters may in other embodiments be automatically adjustable responsive to brightness metric values. In some embodiments, for example, a combination of f-stop and shutter speed may be dynamically adjusted instead of or in conjunction with ISO adjustment.

In some embodiments, while the brightness level of a single frame may be used for adjustment of the camera ISO level, the defined criteria for automated light mode switching in this embodiment is, as mentioned, that the number of successive frames with an exposure value that transgresses the applicable brightness threshold exceed a predefined threshold number of frames.

Different measures for determining image brightness from a captured image may, instead or in addition to, be employed in other embodiments. Some alternative examples for calculating image brightness include, but are not limited to: the number of blacked out pixels in a frame; the number of low-luminosity pixels in a frame, each low-luminosity pixel having a luminosity value lower than a predefined threshold; an average luminosity value for pixels in the image; an average luminosity value for macro-pixels in the frame; and a median luminosity of pixels and/or macro-pixels in the frame. A person skilled in the art will appreciate that a variety of additional or alternative measures can be employed for providing a quantifiable measure of ambient lighting conditions based on captured image data.

In some embodiments, the same threshold number of frames may apply for up-switching and for down-switching the ISO-setting of the camera 69. In such instances, for a certain threshold number—say, ten frames—the camera 69 will automatically be set to the low-light mode when more than ten successive frames fall below the applicable brightness threshold while the camera 69 is in the normal lighting mode, and the camera 69 will automatically be set to the normal-lighting mode when more than ten successive frames fall above the applicable brightness threshold while the camera 69 is in the low-light mode. In this example embodiment, though, different threshold numbers apply for the count of brightness-threshold transgressing frames in up-switching and down-switching, respectively. In particular, in some embodiments, a larger number of brightness threshold-transgressing frames are needed for switching from the normal-lighting mode to the low-light mode than are needed for switching from the low-light mode to the normal-lighting mode.

Likewise, the same brightness value may in some embodiments apply as threshold value for up-switching and for down-switching the ISO setting of the camera 69. In this example embodiment, however, a lower image brightness value is used for searching the ISO setting from the normal-lighting mode to the low-light mode than that which is used for switching the ISO setting from the low-light mode to the normal-lighting mode. The camera controller 214 is therefore biased towards setting the camera 69 to the normal-lighting mode.

In some embodiments, the current lighting mode of the camera 69 is determined. When the camera begins recording, the camera controller 214 automatically determines whether or not the processed video frames include more than a threshold number of consecutive frames with a brightness value of lower than the threshold are captured. If so, the lighting mode is changed to adjust the ISO value, so that the camera 69 operates at a higher ISO value. If not, no change the lighting mode is made, so that the camera 69 continues to function in the existing lighting mode.

Any automatic adjustment to the lighting mode, made consistent during device operation, is persistent until the session is ended (e.g., by powering down of the glasses or exiting of an image capturing application) or until the lighting mode is automatically changed in the opposite direction during a later iteration of the auto-tuning operation.

Note that the glasses 31 in this example embodiment do not have incorporated therein any light sensors to directly measure ambient light levels. Contrary to automated camera sensitivity adjustment in some existing digital cameras, the described automated adjustment action performed by the camera controller 214 is thus executed based not on measurement data from a dedicated light sensor, but is instead based on the processing of image data captured by the camera 69. Some embodiments may provide for automated parameter adjustment based on both measurement signals provided by an on-board light sensor combined with the described processing of live image data sourced from the camera 69.

The above is an example of automatic adjustment of a single image capture parameter (here, camera ISO level) and that different auto-tuning metrics can be applied in other embodiments. Other example image capture parameters that can be auto-adjusted based on the image data include, but are not limited to:

(a) camera shutter speed based on one or more of an image brightness metric and an image sharpness/blurriness metric;

(b) camera exposure settings (e.g., f-stop values) based on one or more of an image brightness metric and an image sharpness/blurriness metric;

(c) camera focus settings based, e.g., on an image sharpness/blurriness metric;

(d) camera white balance settings based for example on an image colorization metric;

(e) camera flash settings based, for example, on an image brightness metric; and (f) image stabilization settings based on one or more of an image brightness metric and an image sharpness/blurriness metric, so that automatic adjustment can be made to the amount of on-board processing devoted to photographic image stabilization.

In some example embodiments, video content is continuously recorded and the timer continues to run in response to persistent engagement with the input mechanism 235, here comprising continued pressing of the camera control button. Release of the input mechanism is identified when the user releases the camera control button. The timer is then stopped, and the recording of video content to a buffer memory ceases.

The activation duration (as indicated by the elapsed time recorded by the timer) is evaluated by the camera controller 214 against a predefined duration threshold (e.g., 1 second, 3 seconds, 0.5 seconds, etc.)

If the threshold duration is exceeded, then the camera controller 214 interprets the user engagement with the camera control button to indicate an intention to record video content, and the recorded video content is then processed and stored. As described above, this processing may involve analysis of initial frames captured using auto bracketing setting to determine if any of these initial frames are suitable for inclusion with the subsequent frames captured using the determined settings for the camera device. In some embodiments, processing of the video content, comprises application of video stabilization processing to the raw image data captured by the camera 69. As will be appreciated by persons skilled in the art, video stabilization processing is in applications such as that described relatively less rigorous than photographic stabilization processing, and is therefore less resource intensive.

If, however, the threshold duration is not exceeded (i.e., if the button is in this example pressed for less than a threshold time of 3 seconds), a frame of the video is selected for providing a digital photograph. The raw image data representative of the selected frame is then processed to apply thereto photographic image stabilization. Thereafter, the stabilized frame is stored, as a digital photograph in the photo content memory 228, and the initial frames captured using automated bracketing are used as needed for photographic image stabilization and then discarded. As mentioned, such photographic image stabilization is more rigorous and therefore more resource intensive than the video stabilization.

It will be appreciated that the particular image stabilization mode that is to be applied to the raw image data prior to presentation thereof to the user is in this embodiment one of the image capture parameters of the glasses 31, which is automatically adjusted in response to single-action input for capturing visual content. Adjustment of the stabilization parameter (e.g., whether or not to apply the relatively more rigorous photographic stabilization processing) is here based, however, on a user input attribute pertaining to user engagement with the single-action bi-modal input mechanism provided by the camera control button. In particular, the activation duration (here, the length of the button press) in this instance automatically determines the manner of image stabilization processing that is to be applied to the captured image data prior to its presentation to the user for viewing or pre-viewing.

Note that, in some embodiments, the stabilization parameter may automatically be adjusted not between a more- and a less rigorous mode, as is the case in the example of FIG. 3, but may be adjusted between a deactivated mode (applicable to video content), in which no image stabilization is performed, and an activated mode (applicable to photographic content). In other embodiments, one or more parameters of a particular mode may automatically be adjusted based on processed image data captured by the camera. Thus, for example, one or more parameters of the photographic image stabilization may automatically be adjusted based on determination of image metric values.

Additionally, as described above in FIGS. 2A and 2B, in some embodiments, the device used to capture video clips or video data using auto bracketing as described herein may be part of a social messaging system 130. The social messaging system may comprise one or more servers connected to the camera device performing the auto bracketing operations via a network (e.g. the Internet or a wide area network (WAN)). In some embodiments, the social messaging system is an ephemeral messaging system that accepts images or video clips with a specified time limit and associated deletion triggers. When the content from a message is associated with criteria from a deflection trigger (e.g. completion of a set number of viewings of a video clip, initiation of play of a video clip a set number of times (e.g. one time, two times, etc.) regardless of completion, viewing by all or some percentage of a group, a set time from communication of the ephemeral message comprising the video clip as content, or any similar criteria or combinations of such criteria), the content is deleted from the system. Within such a context, a message or ephemeral message may be configured to include not just the content (e.g. one or more video clips and photos), but also additional information. In some embodiments described herein, this additional information includes video capture data which describes context for a video clip within the message. This information may include data about the number of different auto bracketing settings that were used to determine the settings finally selected camera settings. Information about how the final camera settings were selected (e.g. quality comparison criteria used to compare the different images captured using different auto bracketing settings) may also be included. Data about a delay from a user input time to a time associated with the first image of the video clip may be included. Data about the time, location, temperature, or any other such sensor data associated with an image clip may be included. This data may then be stored in the system anonymously and independent of any deletion trigger associated with the content. In some embodiments, additional quality analysis of the video clip may be performed at the server prior to deletion of the content due to an ephemeral message. For example, a set of standardized quality metrics may be used to compare frames between video clips received from different devices. Such data may be further sorted based on information about the sensors and lenses of the camera device capturing the video clip, such that quality values are normalized or grouped based on devices with similar sensors, lenses, or other such device values that may be stored with the video capture data.

Once the video capture data is analyzed and stored with associated performance metrics, a server computer of the social messaging system may analyze the aggregated data to determine recommended sets of auto bracketing data. This may, for example, be based on weighted tradeoffs between responsiveness and quality, where additional auto bracketing settings (e.g. using 5 settings instead of 3) causes additional delay between an input and a first frame of a video, but results in increased quality. In some embodiments, the server may generate multiple sets of auto bracketing settings, with a default set, and user selections to improve responsiveness or quality using different settings or numbers of auto bracketing settings with corresponding additional images captured before the standard settings are selected and a consistent framerate established for the video clip.

A quality score, in some embodiments, is based on a detailed exposure analysis of relevant frames in a video clip. For example, a histogram of luminance may be calculated, and a quality may be assigned to the image or video based on a correlation of the histogram with a quality score. Such a correlation may be based on a table or function associating certain histogram patterns with selected quality scores, or may be generated in any other such matters. For video clips where multiple sample frames are analyzed, an average of scores for each frame may be used to select a score, a worst score for an individual frame of all the analyzed frames may be used, or any such combination or function of multiple scores or selections of scores may be used.

In some embodiments, images or sample video frames may be analyzed for compression artifacts or other image processing artifacts that indicate a lower image quality or errors introduced into an image due to various compression or communication problems. For the purposes of selecting auto bracketing settings, thresholds may be set to exclude video clips including such transmission or based degradation, or any other such quality values that do not correlate with any auto bracketing setting. Such artifacts may include image ringing, image contouring, staircase noise along curving edges, posterizing artifacts, or block boundary artifacts. Videos may be analyzed for additional video based compression artifacts such as block boundary artifacts associated with motion compensation or mosquito noise that may be identified by analysis of selected frames of a video. In addition to such information loss associated with compression or lossy transmission, images and video frames may also be analyzed for other types of noise. For example, variance in smooth or uniform regions of an image may be analyzed for noise artifacts, such as noise associated with a low quality or malfunctioning camera sensor, low quality or dirty optics of a camera, or any other such source of noise that may lower, corrupt, or modify the data in the image.

Feedback or machine learning is used in certain embodiments to select or set a quality score. Such systems may use neural networks to extract features identified as preferred or interesting to system users. For example, in some embodiments, images may be selected for a learning set. Some or all images and video frames from the learning set may have features extracted and analyzed using a feed-forward artificial neural network such as a convolutional neural network to identify desirable elements of the images, Feature maps used within such neural networks may be based on any analysis metric described herein, including image quality features and associated responsiveness values.

Once appropriate groups of video capture data and associated performance values are available, the auto bracketing settings and resulting performance values across large sets of data be analyzed to determine preferred auto bracketing settings. This analysis may result in different preferred auto bracketing settings for different devices, different geographic areas, different times of day or year, or based on any other such variables. The resulting auto bracketing update information reflecting the identified best or preferred auto bracketing settings for different contexts are then sent to camera devices connected to the social messaging system. In some embodiments, all sets of auto bracketing settings are sent to the devices, with the device to select between the options based on context (e.g. location, time, etc.), or in some embodiments, different auto bracketing settings are sent to different devices based on associations in the system with the particular device. For example, certain geographies such as beaches or mountains may be associated with different preferred sports settings. Some settings may involve further specific sets of settings, such as a location at a sports arena during a sports event may be associated with different settings than the same location when a non-sports presentation is being given. Such systems enable the social messaging system to provide auto bracketing values targeted to a context while maintaining user anonymity. This enables improved performance and targeted tradeoffs (e.g. quality and responsiveness) without tracking individual user data over time in order to maintain user privacy.

Figure 4B:
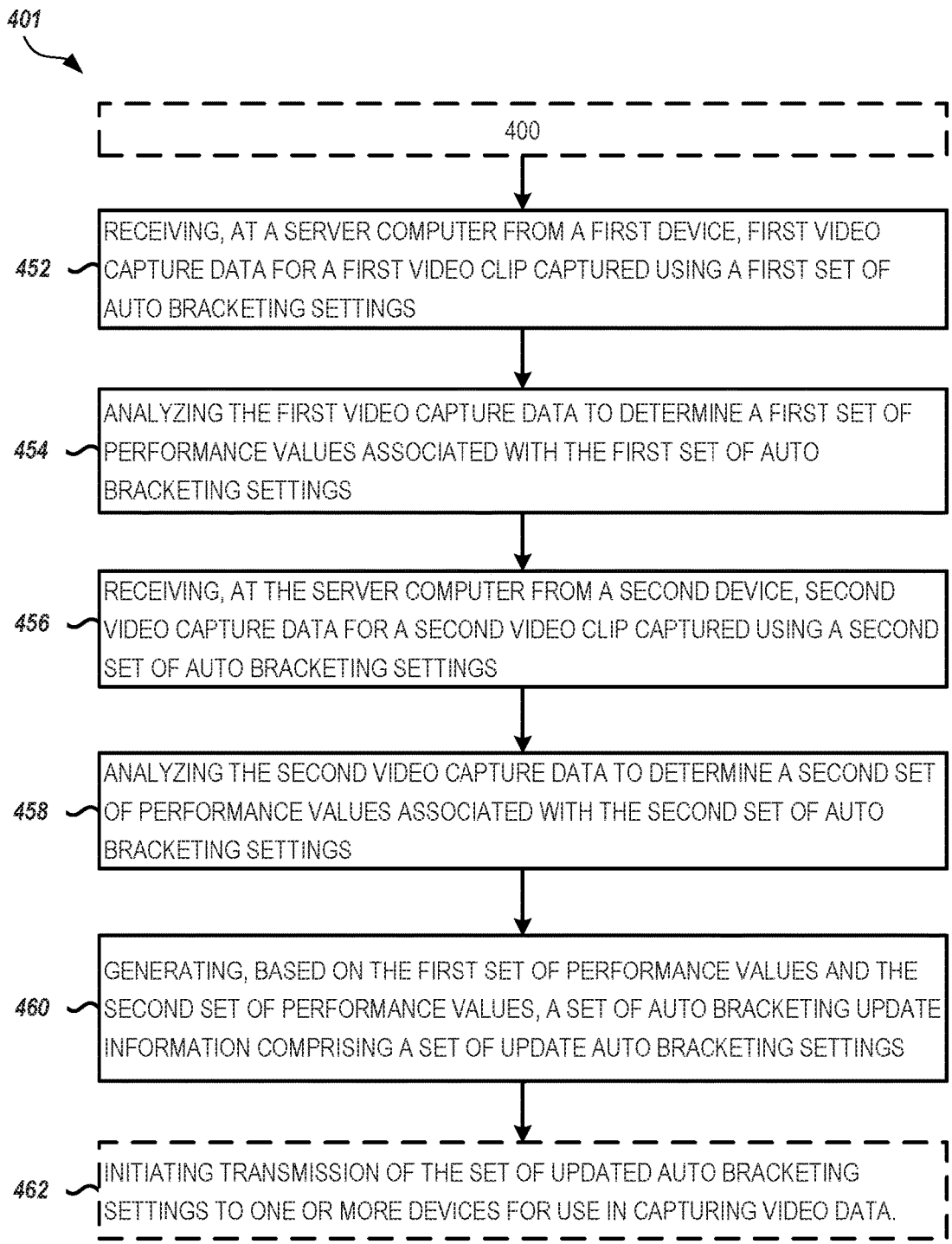
FIG. 4B illustrates a method for generating auto bracketing settings for use with fast video sensor adjustment, in accordance with some example embodiments.

Some embodiments thus operate with server based methods for generating auto bracketing settings. FIG. 4B illustrates a method 401 for generating auto bracketing settings for use with fast video sensor adjustment, in accordance with some example embodiments. In some embodiments, method 401 is a method performed by a server computer in communication with a plurality of devices that generate video clips using auto bracketing operations as described above in method 400. In some embodiments, method 401 is implemented by such a server computer storing video data and associated video capture data in memory, with one or more processors of the server computer configured to perform operations on the data. In some embodiments, method 401 is instantiated as instructions in a storage medium that, when executed by one or more processors of a device, cause the device to perform operations of method 401. Similarly, method 400 above may be corresponding operations in such formats associated with a wearable camera device.

Method 401 begins with operation 452 where a server computer receives from a first device, first video capture data for a first video clip captured using a first set of auto bracketing settings. This information may be generated by a device performing method 400 as described above, may be received via a host device or intermediate computing device that previously received the data from a wearable device, or by any other such means. Operation 454 then involves analyzing the first video capture data to determine a first set of performance values associated with the first set of auto bracketing settings. These operations are repeated for any number of devices and video clips. In some embodiments, multiple video clips captured with similar or different auto bracketing settings by a single device are received. In some embodiments, all video clips are received from different devices. As part of this collection of data, operations 456 and 458 involve receiving, at the server computer from a second device, second video capture data for a second video clip captured using a second set of auto bracketing settings and analyzing the second video capture data to determine a second set of performance values associated with the second set of auto bracketing settings. Once sufficient data is collected, method 401 proceeds with operation 460 of calculating or otherwise generating, based on the first set of performance values and the second set of performance values, a set of auto bracketing update information comprising a set of update auto bracketing settings. In some embodiments, this information may then optionally be transmitted to any number of devices for use in capturing video data with fast video capture and sensor adjustment as described herein.

In some embodiments, such a method may operate where the first set of performance values and the second set of performance values each comprise a quality value for a first frame and a responsiveness value for the first frame of a corresponding video clip. Such a method may further include receiving, at the server computer from a plurality of devices comprising at least the first device, the second device, and a plurality of additional devices, associated video capture data for a corresponding video clips from each device of the plurality of devices, the associated video capture data comprising corresponding auto bracketing settings for each of the corresponding video clips; and analyzing the associated video capture data to determine performance values associated with the corresponding auto bracketing settings; where the set of auto bracketing update information is further based on the performance values associated with the corresponding auto bracketing setting.

In some such embodiments, analyzing the associated video capture data to determine the performance values comprises analyzing statistical correlation values between quality values, responsiveness values, and individual settings of the corresponding auto bracketing settings; and generating the set of auto bracketing update information comprises analyzing quality values and responsiveness values for the corresponding video clips based on a set of weighted tradeoff criteria between quality and responsiveness to select the set of update auto bracketing settings. Similarly, some embodiments operate where the a set of auto bracketing update information indicates a change in a number of auto bracketing settings and corresponding initial frames to be captured in order to adjust an expected responsiveness performance, and some embodiments operate where the first video capture data comprises a number of auto bracketing settings used during capture of the first video clip, auto bracketing values for each auto bracketing setting of the number of auto bracketing settings, and an indicator of a selected auto bracketing setting of the number of auto bracketing setting used to captured the first video clip.

In some embodiments, auto bracketing update information may be sent to devices that did not contribute to the dataset used to generate the auto bracketing update. In some embodiments, the information may be relayed to a host device such as a mobile phone, and accessed by the wearable device based on the context, such that the mobile phone will include many sets of auto bracketing settings for various contexts, and will provide the appropriate auto bracketing settings to the camera device when a handshaking between the wearable device and the phone occurs in a given context.

In such an embodiment, the wearable device may store only a single set of auto bracketing settings, or a small number of settings for use when not connected to the host, and the host will maintain a larger set of auto bracketing settings. The host device updates the wearable device based on current or expected contexts, and the server system of the social messaging system provides a larger set of auto bracketing settings to the host device based on the server analysis of data from a large group of users.

Figure 5A:
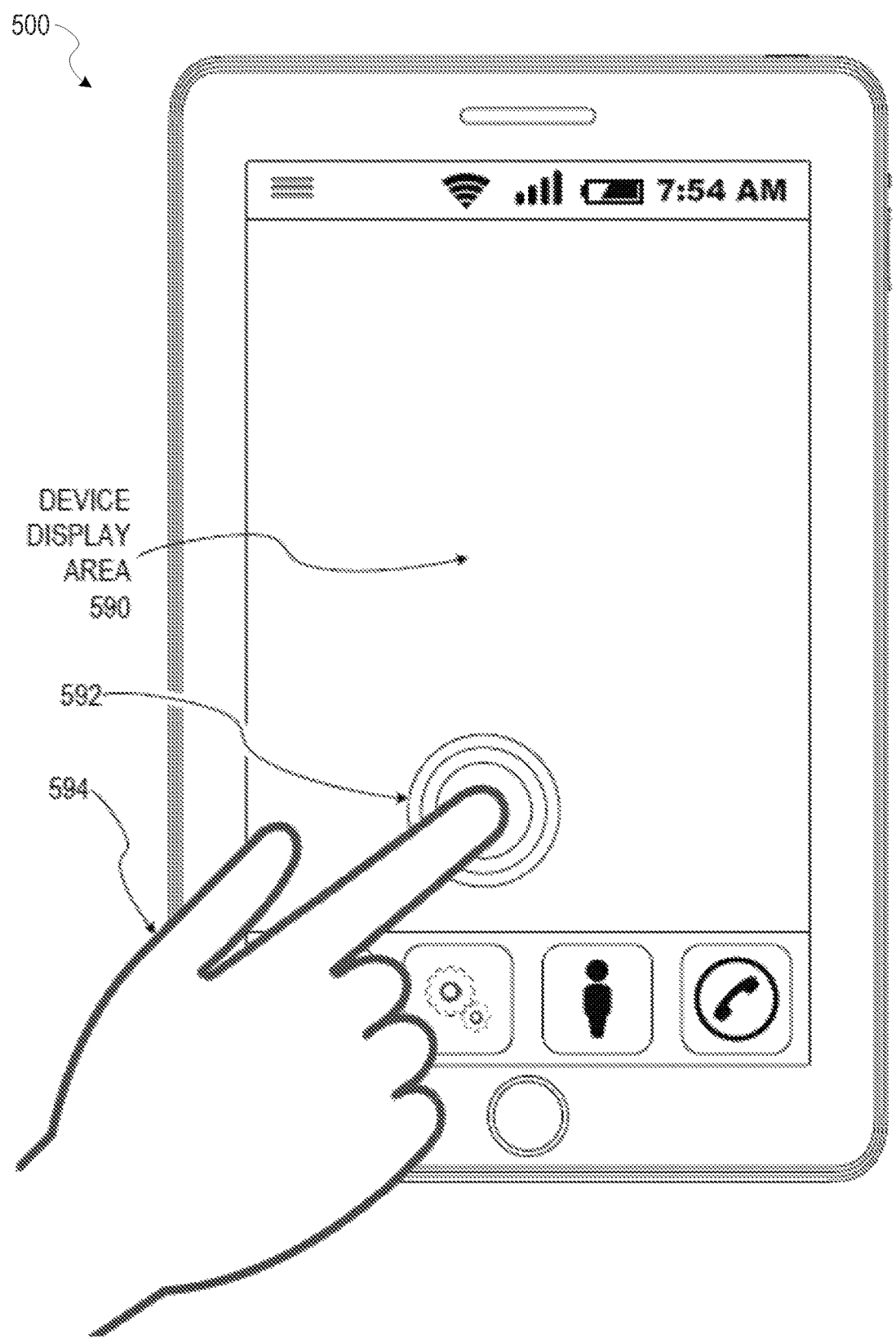
FIG. 5A is a schematic front view of a portable electronic device in the form of a smartphone with functionalities to perform fast video capture and sensor adjustment actions with respect to image capture parameters, according to some example embodiments.

FIG. 5A illustrates an example mobile device 500 that may be used as a host device for pairing with a wearable device in accordance with embodiments described herein. Inputs and adjustments to any system operation described herein may be performed using touch screen inputs 592 within device display area 590 by a user 594. Additionally, communication of data including video capture data, ephemeral messages or content, and update data may be communicated between a wearable device and a messaging system by mobile device 500 in accordance with different embodiments.

Figure 5B:
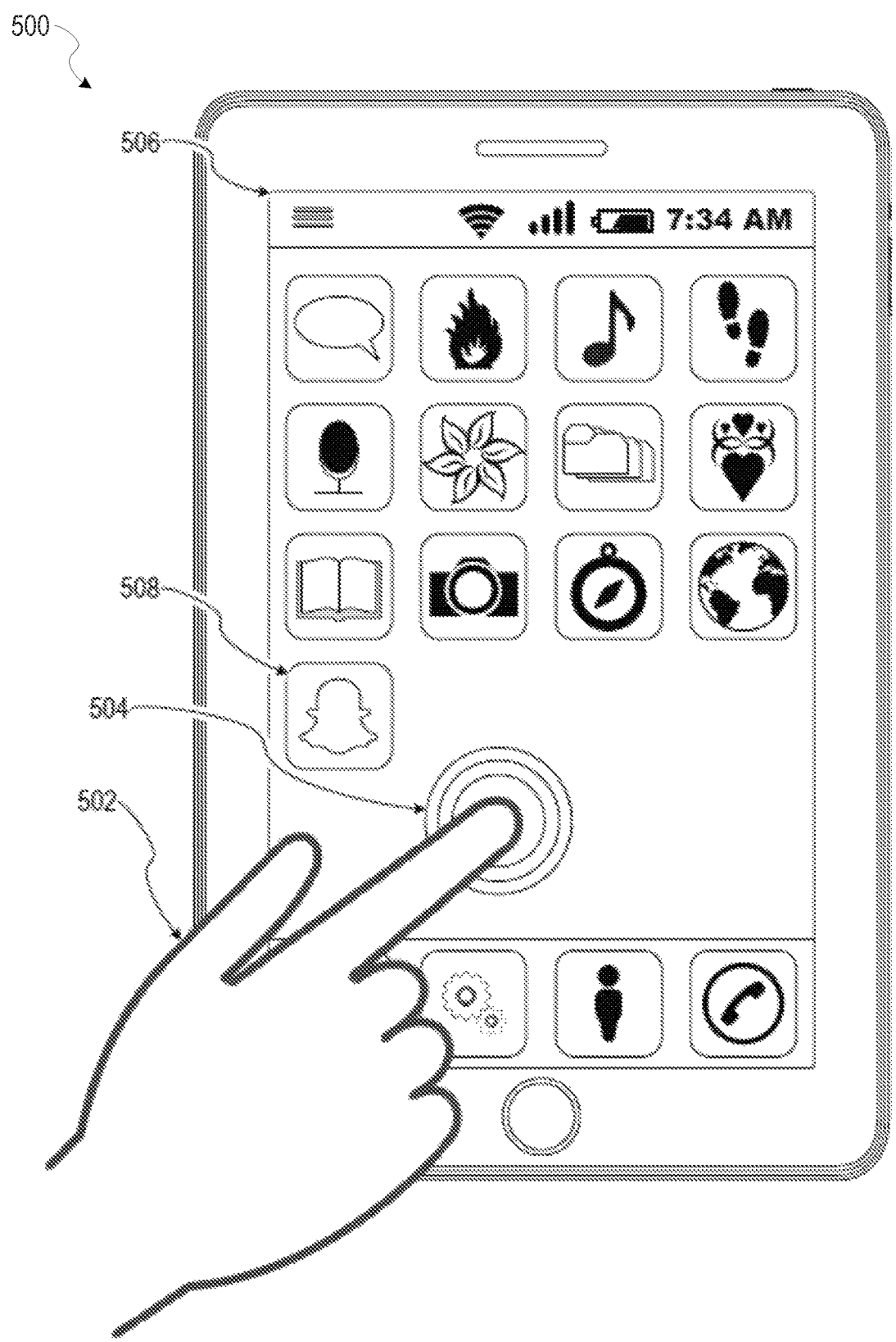
FIG. 5B is a schematic front view of a portable electronic device in the form of a smartphone with functionalities to perform fast video capture and sensor adjustment actions with respect to image capture parameters, according to some example embodiments.

FIG. 5B illustrates an example mobile device 500 executing a mobile operating system (e.g., IOS™, ANDROID™, WINDOWS® Phone, or other mobile operating systems), consistent with some embodiments. In one embodiment, the mobile device 500 includes a touch screen operable to receive tactile data from a user 502. For instance, the user 502 may physically touch 504 the mobile device 500, and in response to the touch 504, the mobile device 500 may determine tactile data such as touch location, touch force, or gesture motion. In various example embodiments, the mobile device 500 displays a home screen 506 (e.g., Springboard on IOS™) operable to launch applications or otherwise manage various aspects of the mobile device 500. In some example embodiments, the home screen 506 provides status information such as battery life, connectivity, or other hardware statuses. The user 502 can activate user interface elements by touching an area occupied by a respective user interface element. In this manner, the user 502 interacts with the applications of the mobile device 500. For example, touching the area occupied by a particular icon included in the home screen 506 causes launching of an application corresponding to the particular icon.

Many varieties of applications (also referred to as "apps") can be executed on the mobile device 500, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 500 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 500 includes a social messaging app 508 such as SNAPCHAT® that, consistent with some embodiments, allows users to exchange ephemeral messages that include media content. In this example, the social messaging app 508 can incorporate aspects of embodiments described herein. For example, the social messaging app 508 may have one or more ephemeral message thresholds, such that a message (e.g. a communication including video content recorded by a wearable device) is deleted after a threshold time in the system, a threshold number of views by one or more recipients, or any such deletion trigger or combination of deletion triggers. A wearable device may thus, in accordance with some embodiments, capture a video file having a maximum duration specified by social messaging app 508 using fast video capture and sensor adjustment, in accordance with embodiments described herein. The wearable device may communicate the captured video file to a host device, which may then communicate the video file to a server computer system operating as part of the social messaging system. The file may then be relayed to a recipient, with deletion of the ephemeral message comprising the video file managed by the social messaging system. The server computer system may receive the video file along with context data that can be used to assess the operation of the video bracketing. This information may be anonymized and aggregated with data from many users to determine improved auto bracketing values. This information may further incorporate location, time, or other such information, and can be sent out to wearable devices to update the auto bracketing settings used for future video capture.

Figure 5C:
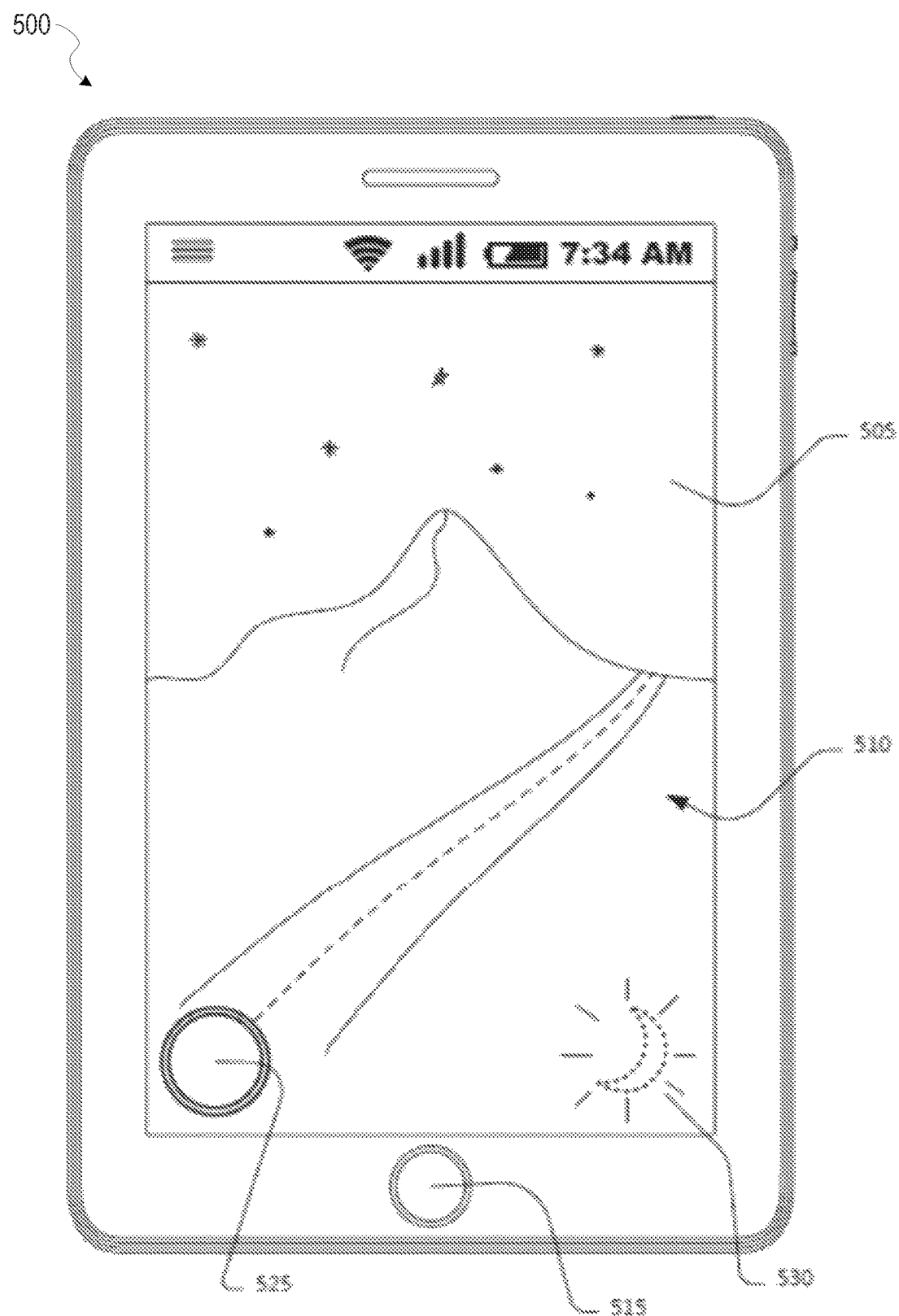
FIG. 5C is a schematic front view of a portable electronic device in the form of a smartphone with functionalities to perform fast video capture and sensor adjustment actions with respect to image capture parameters, according to some example embodiments.

FIG. 5C illustrates an example user interface 510 generated during execution of the application. The user interface 510 includes a display of a current scene captured by a camera of the smartphone 500. The user interface 510 further includes a soft button 525 generated on the touchscreen 505 for receiving haptic input from the user to control camera operation. The soft button 525 thus corresponds in function to the camera control button described above.

The user interface 510 further includes a user-selectable user-interface element in the example form of a low-light icon 530 that is automatically surfaced on the display when low-light conditions or other particular predetermined environmental conditions are identified. In some embodiments, this enables user switching of the camera to the low-light mode, and selection of an associated set of auto bracketing values. Other embodiments may include other inputs for selecting different sets of auto bracketing values.

It will be seen that the above-described techniques and any methods described herein represent one example embodiment of an aspect of the disclosure that provides a portable electronic device comprising: a frame; a camera mounted on the frame and configured to capture and process image data according to a group of image capture parameters; an input mechanism provided on the frame and configured for receiving user input to control operation of the camera; and a camera controller incorporated in the frame and configured to perform an automated adjustment action with respect to one or more of the group of image capture parameters of the camera based at least in part on a user input attribute pertaining to user engagement with the input mechanism to dispose the input mechanism to the engaged condition.

In some embodiments, the input mechanism may be a bi-modal mechanism, being disposable by a user exclusively between an engaged condition and a disengaged condition. The input mechanism may in some such embodiments be a haptic mechanism, for example comprising a button which is pressable by the user to dispose it from the disengaged condition to the engaged condition.

In some embodiments, the automated adjustment action may include automatically causing display of a user interface element on a user interface provided by the portable electronic device. In some such embodiments, the camera controller may be configured to modify the one or more image capture parameters responsive to user selection of the user interface element.

In some embodiments, the automated adjustment action may include automatically modifying the one or more image capture parameters, without requesting intervening user input to confirm or authorize the modification.

In some embodiments, the user input attribute may include an activation duration indicating a duration for which the input mechanism is disposed to the engaged condition during the user engagement.

In some embodiments, the input mechanism may include a control button carried by the frame of the portable electronic device, such that disposal of the input mechanism to the engaged condition comprises pressing of the control button by the user, with the activation duration indicating a period for which the control button is continuously pressed by the user. In some embodiments, the control button is the only mechanism incorporated in the frame for receiving manual user input to control functioning of the camera. In some embodiments, the portable electronic device is an article of eyewear, and the frame may be head-mountable for carrying one or more optical elements within a field of view of the user. The eyewear frame may in some embodiments carry the control button on an externally accessible surface as a solitary control mechanism by which manual user control of camera operation is achievable.

The described techniques further represent example embodiments of a method for operating an electronic device consistent with the above-discussed features, and a computer readable storage medium with instructions for causing a machine to perform such a method.

It is a benefit of the disclosed techniques that they provide for an electronic device with improved image-capturing functionalities compared to existing devices. The quality of the initial images captured by use of the device is, for example, improved due to automated auto bracketing of the relevant parameters, capture of images using these parameters, and inclusion of appropriate frames in a video clip. This is achieved without requiring additional user input or parameter adjustment.

Example Machine and Hardware Components

The example electronic devices described above may incorporate various computer components or machine elements, at least some of which are configured for performing automated operations and/or for automatically providing various functionalities. These include, for example, automated image data processing and image capturing parameter adjustment, as described. The glasses 31 may thus provide an independent computer system. Instead, or in addition, the glasses 31 may form part of a distributed system including on ore more off-board processors and/or devices.

Figure 6:
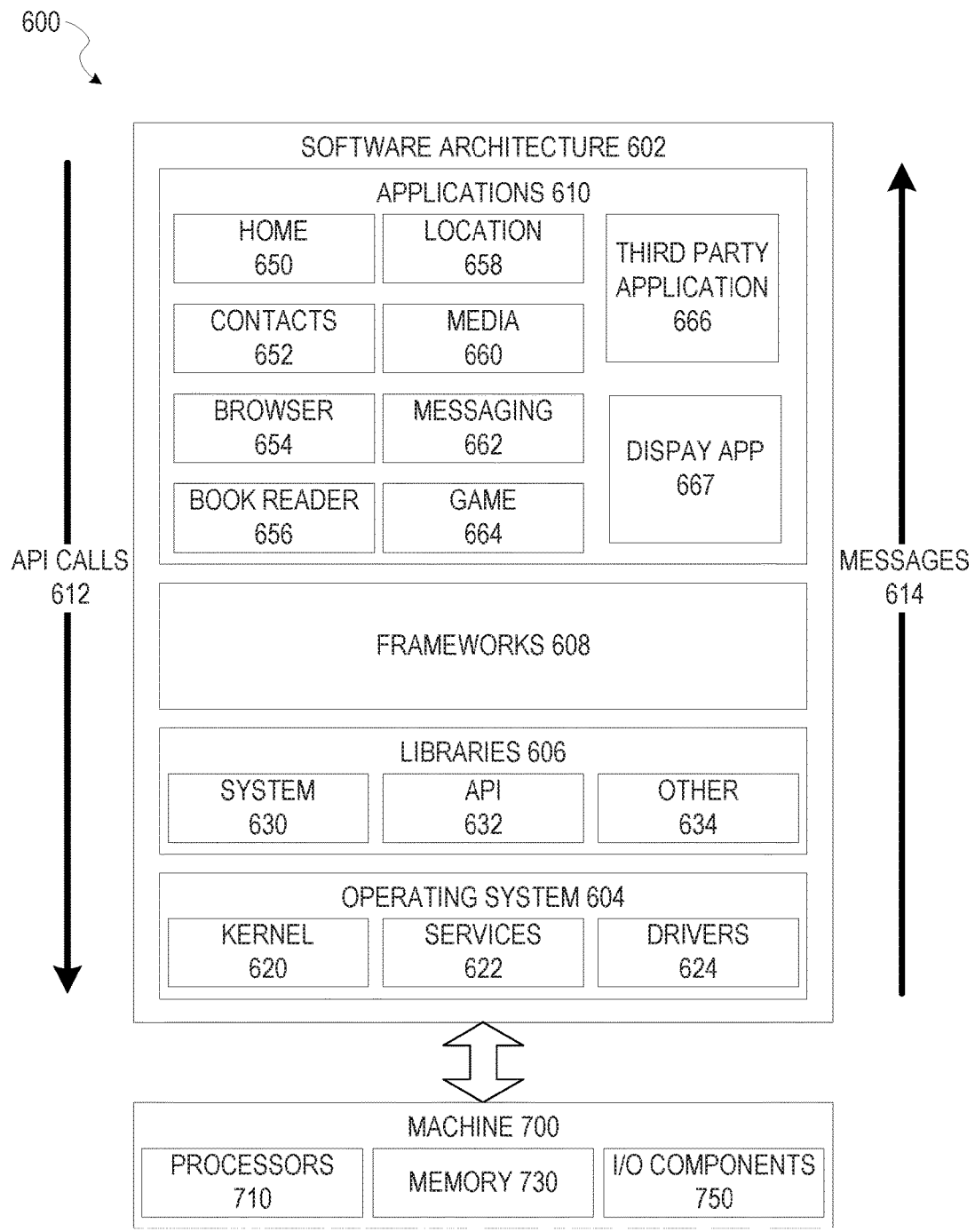
FIG. 6 is a block diagram illustrating an example of a software architecture that may be installed on a machine and used for fast video sensor adjustment, according to some example embodiments.

FIG. 6 is a block diagram 600 illustrating an architecture of software 602, which can be installed on any one or more of the devices described above. FIG. 6 is merely a non-limiting example of a software architecture, and it will be appreciated that many other architectures can be implemented to facilitate the functionality described herein. In various embodiments, the software 602 is implemented by hardware such as machine 700 of FIG. 6 that includes processors 710, memory 730, and I/O components 750. In this example architecture, the software 602 can be conceptualized as a stack of layers where each layer may provide a particular functionality. For example, the software 602 includes layers such as an operating system 604, libraries 606, frameworks 608, and applications 610. Operationally, the applications 610 invoke API calls 612 through the software stack and receive messages 614 in response to the API calls 612, consistent with some embodiments. In various embodiments, any client device, server computer of a server system, or any other device described herein may operate using elements of software 602. Devices such as the camera controller 214 and other components of the portable electronic devices, as described earlier, may additionally be implemented using aspects of software 602.

In various implementations, the operating system 604 manages hardware resources and provides common services. The operating system 604 includes, for example, a kernel 620, services 622, and drivers 624. The kernel 620 acts as an abstraction layer between the hardware and the other software layers consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In certain implementations of a device such as the camera controller 214 of smart glasses 31, low-power circuitry may operate using drivers 624 that only contain BLUETOOTH® Low Energy drivers and basic logic for managing communications and controlling other devices, with other drivers operating with high-speed circuitry.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render two-dimensional (2D) and 3D graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system or platform.

In an example embodiment, the applications 610 include a home application 650, a contacts application 652, a browser application 654, a book reader application 656, a location application 658, a media application 660, a messaging application 662, a game application 664, and a broad assortment of other applications such as a third party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 666 can invoke the API calls 612 provided by the operating system 604 to facilitate functionality described herein.

Embodiments described herein may particularly interact with a display application 667. Such an application 667 may interact with I/O components 750 to establish various wireless connections with the described devices. Display application 667 may, for example, communicate with the camera controller 214 to automatically control display of visual media captured by the glasses 31.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 7:
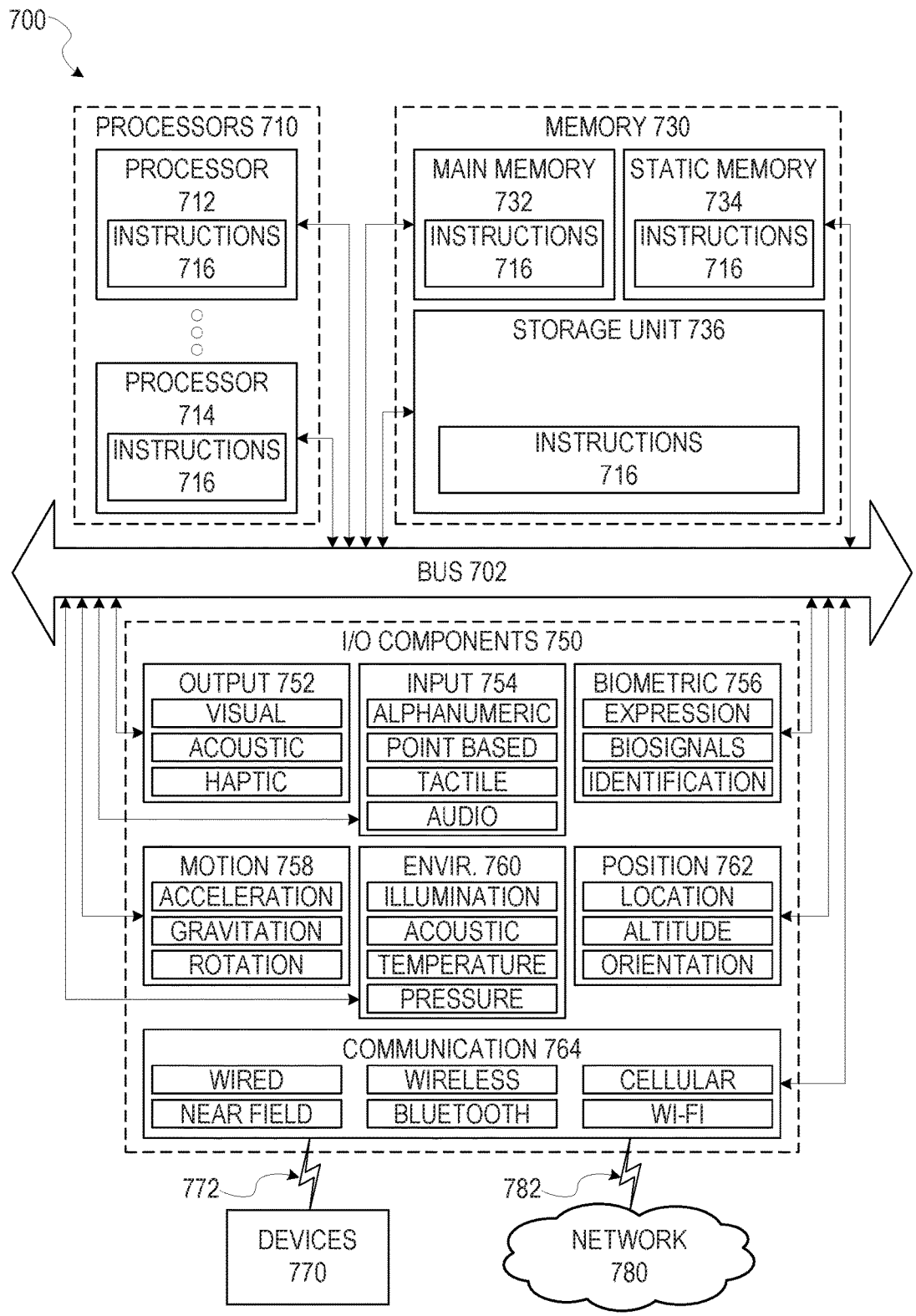
FIG. 7 illustrates a diagrammatic representation of a machine in the form of a computer system within which a set of instructions may be executed for causing the machine to perform any one or more of the methodologies discussed herein, according to some example embodiments.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) include, for example, a processor 712 and a processor 714 that may execute the instructions 716. The term "processor" is intended to include multi-core processors that may comprise two or more independent processors (also referred to as "cores") that can execute instructions contemporaneously. Although FIG. 6 shows multiple processors 710, the machine 700 may include a single processor with a single core, a single processor with multiple cores (e.g., a multi-core processor), multiple processors with a single core, multiple processors with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown in an example embodiment to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 6. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 770 may be another machine or any of a wide variety of peripheral devices (e.g., a peripheral device coupled via a USB).

Moreover, in some embodiments, the communication components 764 detect identifiers or include components operable to detect identifiers. For example, the communication components 764 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., HTTP). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the medium 738 should be considered as being transportable from one physical location to another. Additionally, since the machine-readable medium 738 is tangible, the medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, at an input mechanism of a wearable camera device, a user input to initiate capture of first video data;
capturing a first plurality of frames using camera settings based on a set of auto bracketing settings in response to the user input, each frame of the first plurality of frames having associated camera settings which are different for each frame of the first plurality of frames, wherein the associated camera settings are determined from the set of auto bracketing settings;
processing, in response to the user input, a set of sensor data to determine a set of camera setting values for an environment of the wearable camera device;
selecting the camera settings for the wearable camera device using the set of camera setting values after the first plurality of frames are captured; and
capturing a second plurality of frames with the camera settings selected using the set of camera setting values;
wherein the set of sensor data comprises the first plurality of frames; and
wherein the set of camera setting values comprises:
a number of blacked out pixels for each frame of the first plurality of frames;
a number of low-luminosity pixels for each frame of the first plurality of frames, each low-luminosity pixel having a luminosity value lower than a predefined threshold;
an average luminosity value for pixels in each frame of the first plurality of frames; and
a median luminosity of pixels and macro-pixels in each frame of the first plurality of frames.

2. The method of claim 1, further comprising:
selecting at least a first frame of the first plurality of frames for inclusion with the first video data based at least in part on associated camera settings for the first frame.

3. The method of claim 2, further comprising:
storing the first video data as a data file comprising the first frame and the second plurality of frames.

4. The method of claim 3, further comprising:
receiving the set of auto bracketing settings from a network server computer system via a wireless transceiver of the wearable device prior to capture of the first plurality of frames.

5. The method of claim 4 further comprising:
communicating, to the network server computer system via the wireless transceiver, the set of camera settings.

6. The method of claim 5, further comprising:
communicating the set of camera settings to the network server computer system with a set of context data.

7. The method of claim 6, wherein the context data comprises a time of day and a location.

8. The method of claim 6, further comprising:
receiving, from the network server computer system following communication of the set of camera settings to the network server computer, updated auto bracketing settings, wherein the updated auto bracketing settings are generated by the network server computer system based on a plurality of sets of camera settings from a plurality of camera devices; and
wherein the plurality of camera devices comprises the wearable camera device.

9. The method of claim 1 wherein the camera settings comprise an International Standards Organization (ISO) setting and an exposure level setting.

10. The method of claim 9, wherein the camera settings further comprise one or more settings of:
(a) a camera shutter speed based on one or more of an image brightness metric and an image sharpness metric for a first frame of the first plurality of frames;
(b) camera exposure settings based on one or more of the image brightness metric and the image sharpness metric of the first frame of the first plurality of frames;
(c) camera focus settings;
(d) camera white balance settings based on an image colorization metric;
(e) camera flash settings based on the image brightness metric; and
(f) image stabilization settings based on one or more of the image brightness metric and the image sharpness metric, so that automatic adjustment can be made to the amount of on-board processing devoted to photographic image stabilization.

11. The method of claim 1, wherein the camera settings are selected by analyzing a frame quality for each frame of the first plurality of frames, and selecting the camera, settings based on auto bracketing settings for a highest quality frame.

12. The method of claim 1, wherein the set of auto bracketing settings are selected from a plurality of auto bracketing settings based on a device clock.

13. The method of claim 12, wherein the plurality of auto bracketing settings are received at the wearable device from a server computer.

14. The method of claim 1, wherein the set of auto bracketing settings are selected from a plurality of auto bracketing settings based on a user selection received prior to the user input.

15. A portable electronic device comprising:
a frame;
a camera mounted on the frame and configured to capture and process image data according to a plurality of image capture parameters;
an input mechanism provided on the frame and configured for receiving se input to control operation of the camera, the input mechanism being disposable by a user between an engaged condition and a disengaged condition; and
a camera controller incorporated in the frame and configured to perform an automated bracketing action with respect to a first plurality of images captured, the camera comprising:
receiving, at the input mechanism of a wearable camera device, a user input to initiate capture of first video data;
capturing the first plurality of frames using camera settings based on a set of auto bracketing settings in response to the user input, each frame of the first plurality of frames have associated camera settings which are different for each frame of the first plurality of frames, and the associated camera settings are determined from the set of auto bracketing settings;
processing, in response to the user input, a set of sensor data to determine a set of camera setting values for an environment of the wearable camera device;
selecting the camera settings for the wearable camera device using the set of camera setting values after the first plurality of frames are captured;
capturing a second plurality of frames with the camera settings selected using the set of camera setting values;
selecting at least a first frame of the first plurality of frames for inclusion with the first video data based at least in part on the associated camera settings for the first frame; and
storing the first video data as a data file comprising the first frame and the second plurality of frames;
wherein the set of sensor data comprises the first plurality of frames; and
wherein the set of camera setting values comprises:
a number of blacked out pixels for each frame of the first plurality of frames;
a number of low-luminosity pixels for each frame of the first plurality of frames, each low-luminosity pixel having a luminosity value lower than a predefined threshold;
an average luminosity value for pixels in each frame of the first plurality of frames; and
a median luminosity of pixels and macro-pixels in each frame of the first plurality of frames.

16. The device of claim 15, wherein the user input comprises placement of the input mechanism in the engaged position during a first time period for capture of the first plurality of frames and the second plurality of frames;
wherein the first video data is stored in response to the first time period with the engaged position having a duration longer than a threshold time period; and
wherein the device is configured to store image data when the input mechanism returns to a disengaged position after being in the engaged position for less than the threshold time period.

17. The device of claim 16, wherein the user input comprises a single action mechanical button.

18. A non-transitory computer-readable storage medium having stored thereon instructions that, when executed by a wearable camera device, cause the wearable camera device to perform operations comprising:
detecting a user engagement with an input mechanism forming part of a portable electronic device having an on-board camera configured to capture and process image data according to a plurality of image capture parameters, the user engagement comprising disposal of the input mechanism from a disengaged condition to an engaged condition;
processing, in response to the user input, a set of sensor data to determine a set of camera setting values for an environment of the wearable camera device;
capturing a first plurality of frames using camera settings based on a set of auto bracketing settings in response to the user input, each frame of the first plurality of frames having associated camera settings which are different frame each frame of the first plurality of frames, wherein the associated camera settings are determined from the set of auto bracketing settings;
selecting the camera settings for the wearable camera device using the set of camera setting values after the first plurality of frames are captured;
capturing a second plurality of frames with the camera settings selected using the camera settings;
selecting at least a first frame of the first plurality of frames for inclusion with the first video data based at least in part on the camera settings for the first frame; and
storing the first video data as a data file comprising the first frame and the second plurality of frames;
wherein the set of sensor data comprises the first plurality of frames; and
wherein the set of camera setting values comprises:
a number of blacked out pixels for each frame of the first plurality of frames;
a number of low-luminosity pixels for each frame of the first plurality of frames, each low-luminosity pixel having a luminosity value lower than a predefined threshold;
an average luminosity value for pixels in each frame of the first plurality of frames; and
a median luminosity of pixels and macro-pixels in each frame of the first plurality of frames.

19. The non-transitory computer readable storage medium of claim 18, wherein the instructions further cause the machine to perform operations comprising:
communicating, to a server computer system via a host device, an ephemeral message comprising the data file and a set of context data associated with the set of camera setting values.

20. The non-transitory computer readable storage medium of claim 18, wherein the camera settings further comprise one or more settings of:
(a) a camera shutter speed based on one or more of an image brightness metric and an image sharpness metric for a first frame of the first plurality of frames;
(b) camera exposure settings based on one or more of the image brightness metric and the image sharpness metric of the first frame of the first plurality of frames;
(c) camera focus settings;
(d) camera white balance settings based on an image colorization metric;
(e) camera flash settings based on the image brightness metric; and
(f) image stabilization settings based on one or more of the image brightness metric and the image sharpness metric, so that automatic adjustment can be made to the amount of on-board processing devoted to photographic image stabilization.

* * * * *

UNITED STATES PATENT AND TRADEMARK OFFICE
CERTIFICATE OF CORRECTION

PATENT NO. : 10,432,874 B2
APPLICATION NO. : 15/801064
DATED : October 1, 2019
INVENTOR(S) : Peter Brook Page 1 of 1

It is certified that error appears in the above-identified patent and that said Letters Patent is hereby corrected as shown below:

In the Claims

In Column 30, Line 55, in Claim 11, delete "camera," and insert --camera-- therefor In Column 31, Line 7, in Claim 15, delete "se" and insert --user-- therefor In Column 32, Line 14, in Claim 18, delete "frame" and insert --for-- therefor Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*